(12) United States Patent
Nylander et al.

(10) Patent No.: US 7,817,997 B2
(45) Date of Patent: Oct. 19, 2010

(54) REDIRECTION OF IP-CONNECTED RADIO BASE STATION TO CORRECT CONTROL NODE

(75) Inventors: Tomas Nylander, Värmdö (SE); Jari Vikberg, Järna (SE); Paul Mihkel Teder, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 857 days.

(21) Appl. No.: 11/538,088

(22) Filed: Oct. 3, 2006

(65) Prior Publication Data
US 2007/0105527 A1    May 10, 2007

Related U.S. Application Data

(60) Provisional application No. 60/722,983, filed on Oct. 4, 2005, provisional application No. 60/722,984, filed on Oct. 4, 2005, provisional application No. 60/722,982, filed on Oct. 4, 2005, provisional application No. 60/723,946, filed on Oct. 6, 2005, provisional application No. 60/728,780, filed on Oct. 21, 2005, provisional application No. 60/731,495, filed on Oct. 31, 2005.

(51) Int. Cl.
*H04W 4/00* (2009.01)

(52) U.S. Cl. .................. 455/422.1; 455/437; 455/450; 455/451; 455/453; 455/445; 455/446; 455/447

(58) Field of Classification Search .............. 455/442, 455/450–453, 422.1, 445–447; 370/395.21, 370/328–338
See application file for complete search history.

(56) References Cited

U.S. PATENT DOCUMENTS 5,295,153 A    3/1994    Gudmundson
5,920,818 A    7/1999    Frodigh et al.

(Continued)

FOREIGN PATENT DOCUMENTS

EP    1 209 940 A1    5/2002

(Continued)

OTHER PUBLICATIONS

U.S. Office Action mailed Dec. 15, 2008 in U.S. Appl. No. 11/538,084.

(Continued)

*Primary Examiner*—Charles N Appiah
*Assistant Examiner*—John B Byrd, Jr.
(74) *Attorney, Agent, or Firm*—Nixon & Vanderhye, P.C.

(57) ABSTRACT

Methods and apparatus enable a femto radio base station ($28_f$), initially connected to a first or default radio network controller node ($26_1$), to be redirected/reconnected to a second or correct radio network controller node ($26_2$) for use as an active radio network controller node for the femto radio base station ($28_f$). The redirection/reconnection is accomplished by using location-indicative information obtained from a user equipment unit (30) which is in radio communication with the femto radio base station ($28_f$). The technique of redirection is particularly valuable when the femto radio base station ($28_f$) does not have its own receiver for ascertaining the radio access network (RAN) environment.

23 Claims, 15 Drawing Sheets

U.S. PATENT DOCUMENTS

| | | | | |
|---|---|---|---|---|
| 6,173,183 B1 | * | 1/2001 | Abu-Amara et al. | 455/442 |
| 6,178,327 B1 | | 1/2001 | Gomez | |
| 6,289,219 B1 | * | 9/2001 | Patronen et al. | 455/436 |
| 6,289,220 B1 | | 9/2001 | Spear | |
| 6,430,414 B1 | | 8/2002 | Sorokine et al. | |
| 6,477,154 B1 | * | 11/2002 | Cheong et al. | 370/328 |
| 6,532,361 B1 | | 3/2003 | Kamperschroer | |
| 6,615,035 B1 | | 9/2003 | Lucidarme et al. | |
| 6,816,729 B1 | * | 11/2004 | Halonen | 455/436 |
| 6,853,627 B1 | | 2/2005 | Evans | |
| 6,993,359 B1 | | 1/2006 | Nelakanti et al. | |
| 7,003,297 B2 | | 2/2006 | Willars et al. | |
| 7,054,638 B2 | | 5/2006 | Rune et al. | |
| 7,072,656 B2 | | 7/2006 | Willars et al. | |
| 7,072,663 B2 | | 7/2006 | Ramos et al. | |
| 7,145,890 B1 | | 12/2006 | Seo et al. | |
| 7,286,801 B2 | * | 10/2007 | Amerga et al. | 455/67.11 |
| 7,295,812 B2 | | 11/2007 | Haapoja et al. | |
| 7,366,542 B2 | | 4/2008 | Schmidt | |
| 7,369,854 B2 | * | 5/2008 | Gallagher et al. | 455/436 |
| 2001/0041572 A1 | * | 11/2001 | Lundqvist et al. | 455/450 |
| 2002/0082014 A1 | * | 6/2002 | Andersson et al. | 455/436 |
| 2002/0094817 A1 | | 7/2002 | Rune et al. | |
| 2002/0111180 A1 | | 8/2002 | Hogan et al. | |
| 2002/0123348 A1 | | 9/2002 | Willars et al. | |
| 2002/0131387 A1 | | 9/2002 | Pitcher et al. | |
| 2002/0151304 A1 | | 10/2002 | Hogan | |
| 2002/0187793 A1 | | 12/2002 | Papadimitriou et al. | |
| 2003/0013443 A1 | | 1/2003 | Willars et al. | |
| 2003/0119501 A1 | | 6/2003 | Kim | |
| 2003/0214925 A1 | | 11/2003 | Diaz Cervera et al. | |
| 2004/0053606 A1 | | 3/2004 | Artamo et al. | |
| 2004/0053630 A1 | | 3/2004 | Ramos et al. | |
| 2004/0057420 A1 | | 3/2004 | Curcio et al. | |
| 2004/0092259 A1 | | 5/2004 | Blanc et al. | |
| 2004/0132486 A1 | | 7/2004 | Halonen et al. | |
| 2004/0157600 A1 | | 8/2004 | Stumpert et al. | |
| 2004/0203346 A1 | | 10/2004 | Myhre et al. | |
| 2004/0203737 A1 | | 10/2004 | Myhre et al. | |
| 2004/0203800 A1 | | 10/2004 | Myhre et al. | |
| 2004/0204097 A1 | | 10/2004 | Scheinert et al. | |
| 2004/0258070 A1 | | 12/2004 | Arima | |
| 2005/0157673 A1 | | 7/2005 | Verma et al. | |
| 2005/0201281 A1 | | 9/2005 | Damnjanovic et al. | |
| 2005/0202828 A1 | | 9/2005 | Pecen et al. | |
| 2005/0239453 A1 | | 10/2005 | Vikberg et al. | |
| 2006/0040664 A1 | | 2/2006 | Murray et al. | |
| 2006/0246899 A1 | | 11/2006 | Buckley et al. | |
| 2007/0097938 A1 | | 5/2007 | Nylander et al. | |
| 2007/0097939 A1 | | 5/2007 | Nylander et al. | |
| 2007/0097983 A1 | | 5/2007 | Nylander et al. | |
| 2007/0105568 A1 | | 5/2007 | Nylander et al. | |
| 2007/0121540 A1 | | 5/2007 | Sharp et al. | |
| 2008/0070565 A1 | | 3/2008 | Maeda | |

FOREIGN PATENT DOCUMENTS

| | | |
|---|---|---|
| EP | 1 351 530 A1 | 10/2003 |
| EP | 1 363 468 A1 | 11/2003 |
| EP | 1 549 097 A1 | 6/2005 |
| GB | 2 428 942 A | 2/2007 |
| WO | 98/25431 A1 | 6/1998 |
| WO | 99/41932 | 8/1999 |
| WO | 01/80582 A2 | 10/2001 |
| WO | 02/065808 A1 | 8/2002 |
| WO | 03/105380 A1 | 12/2003 |
| WO | 2004/039111 A1 | 5/2004 |
| WO | 2004/040938 A1 | 5/2004 |
| WO | 2005/065214 A2 | 7/2005 |
| WO | 2005/079087 A1 | 8/2005 |
| WO | 2005/086421 A1 | 9/2005 |
| WO | 2005/012101 A1 | 12/2005 |

OTHER PUBLICATIONS

U.S. Office Action mailed Nov. 25, 2008 in U.S. Appl. No. 11/538,081.

U.S. Office Action mailed Dec. 8, 2008 in U.S. Appl. No. 11/538,080.

U.S. Office Action mailed Dec. 30, 2008 in U.S. Appl. No. 11/538,078.

v U.S. Office Action mailed Sep. 12, 2008 in U.S. Appl. No. 11/380,824.

U.S. Office Action mailed Feb. 4, 2009 in U.S. Appl. No. 11/538,077.

International Search Report and Written Opinion mailed May 9, 2007 in PCT application PCT/SE06/050373.

International Search Report and Written Opinion for PCT/SE2006/050367 mailed Feb. 9, 2007.

Menolascino et al, "Third Generation Mobile Systems Planning Issues", Vehicular Technology Conference, 1998, VTC 98, 48$^{th}$ IEEE Ottawa, Ont., Canada, May 18-21, 1998, New York, NY, USA, IEEE, US ISBN 0-6\7803-4320-4, pp. 830-834, esp. Section II F.

International Search Report and Written Opinion mailed Feb. 27, 2007 in PCT application No. PCT/SE2006/050371.

U.S. Appl. No. 11/538,081, entitled "Access Control in Radio Access Network Having Pico Base Stations", filed Oct. 3, 2006.

U.S. Appl. No. 11/380,824, filed Apr. 28, 2006, entitled "Dynamic Building of Monitored Set".

International Search Report and Written Opinion mailed Mar. 29, 2007 in PCT application PCT/SE2006/050355.

International Search Report and Written Opinion mailed Feb. 27, 2007 in PCT application PCT/SE2006/050370.

U.S. Office Action mailed Mar. 4, 2010 in U.S. Appl. No. 11/538,077.

Shin et al, "Packet Scheduling Over A Shared Wireless Link For Heterogeneous Classes of Traffic", IEEE Communications Society, © 2004 IEEE, pp. 58-62.

* cited by examiner

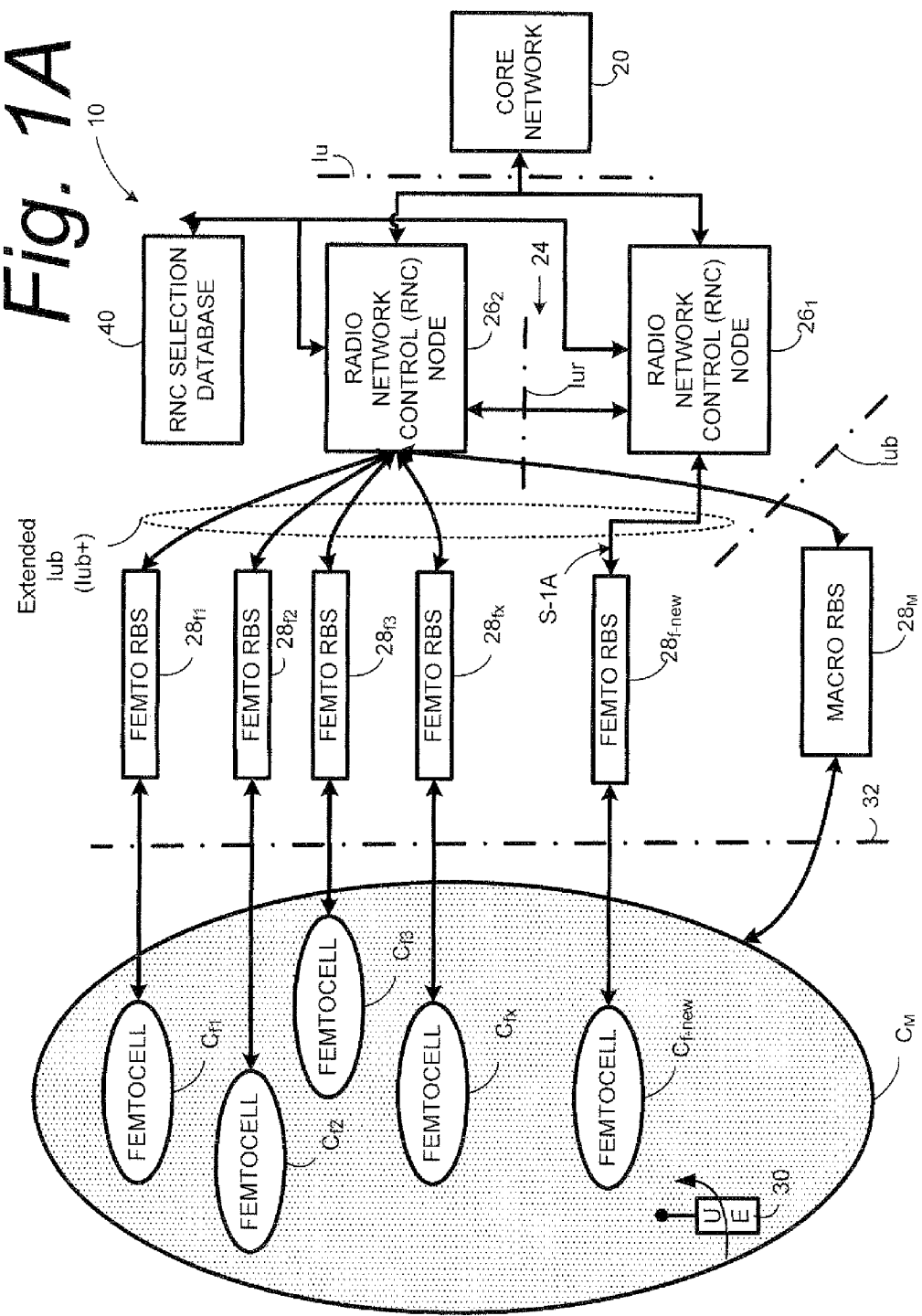

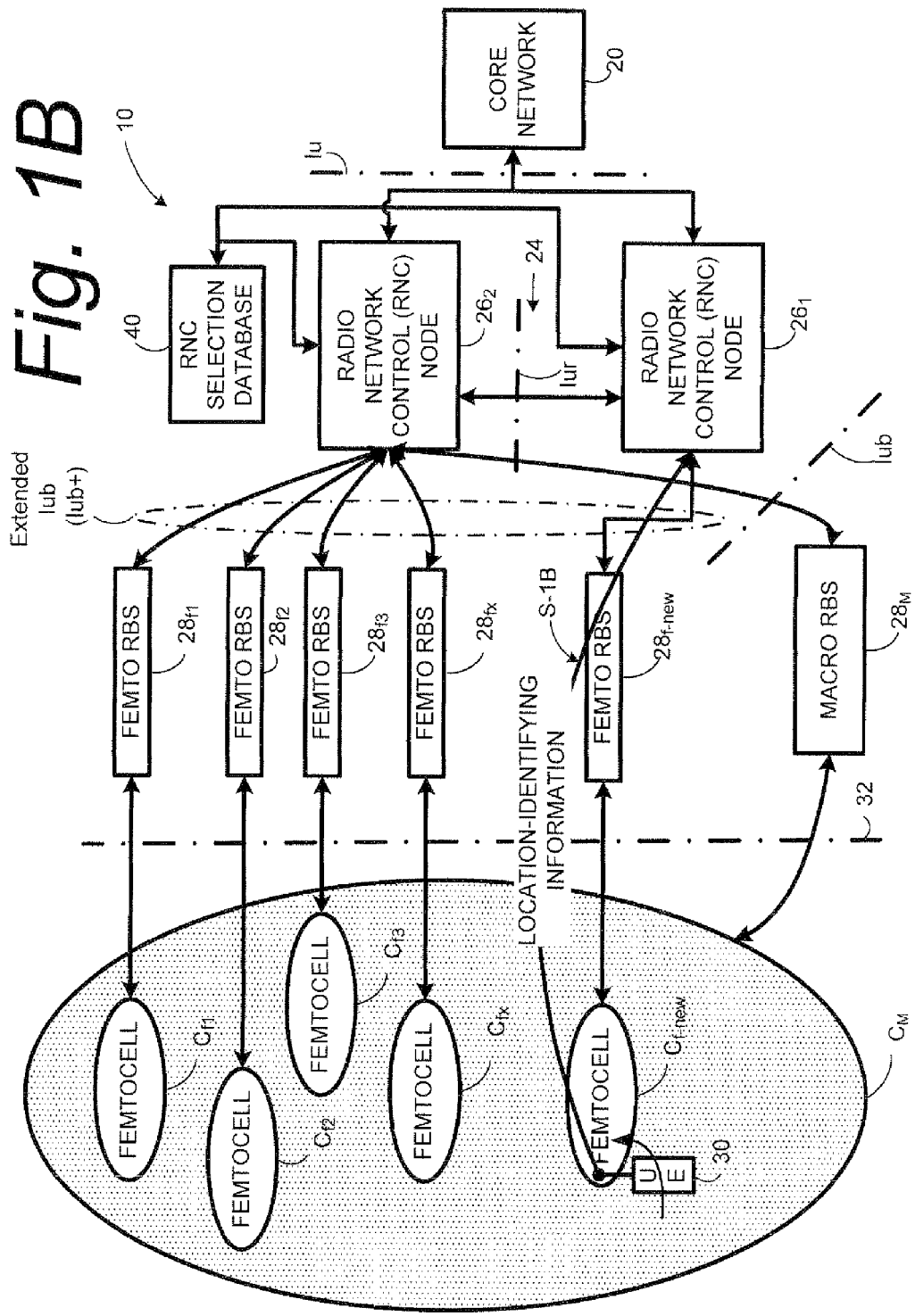

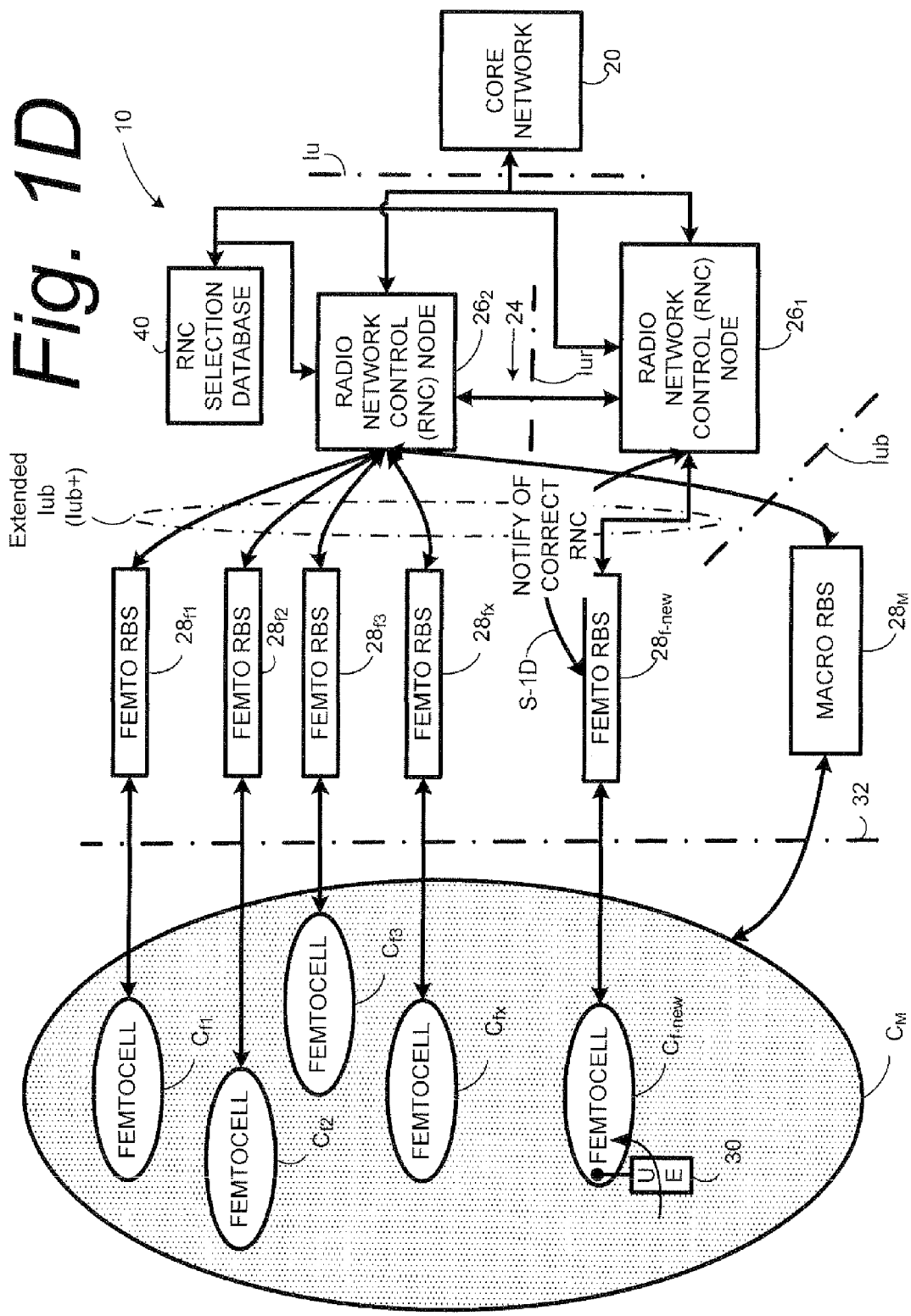

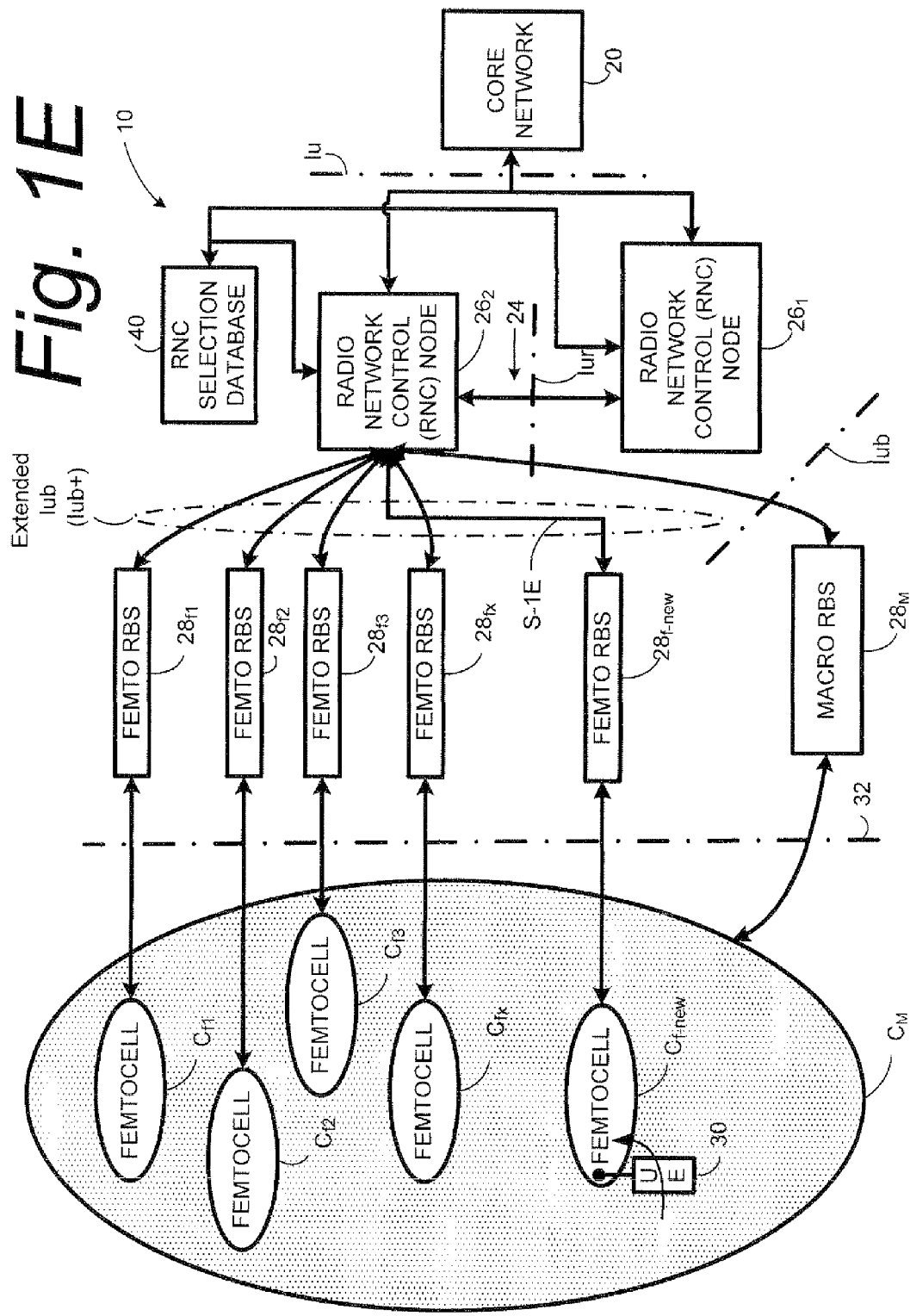

REDIRECTION OF IP-CONNECTED RADIO BASE STATION TO CORRECT CONTROL NODE

CROSS REFERENCE TO RELATED APPLICATIONS

This application claims the benefit and priority of the following United States provisional patent applications (all of which are incorporated herein by reference in their entirety):

U.S. Provisional Patent Application 60/722,983, filed Oct. 4, 2005, entitled "REDIRECTION OF IP-CONNECTED RBS TO THE CORRECT RNC";

U.S. Provisional Patent Application 60/722,984, filed Oct. 4, 2005, entitled "AUTOMATIC RNC SELECTION FOR IP-CONNECTED RBS";

U.S. Provisional Patent Application 60/722,982, filed Oct. 4, 2005, entitled "FINE-GRAINED ACCESS CONTROL IN A WCDMA SYSTEM USING PICO BASE STATIONS";

U.S. Provisional Patent Application 60/723,946, filed Oct. 6, 2005, entitled "PAGING FOR A WCDMA SYSTEM USING PICO BASE STATIONS";

U.S. Provisional Patent Application 60/728,780, filed Oct. 21, 2005, entitled "AUTOMATIC BUILDING OF NEIGHBOR LISTS IN A MOBILE SYSTEM"; and U.S. Provisional Patent Application 60/731,495, filed Oct. 31, 2005, entitled "AUTOMATIC CONFIGURATION OF THE MACRO RADIO IN A PICO BASE STATION".

This application is related to the following United States patent applications (all of which are incorporated herein by reference in their entirety):

U.S. patent application Ser. No. 11/538,088, filed simultaneously, entitled "REDIRECTION OF IP-CONNECTED RBS TO THE CORRECT RNC";

U.S. patent application Ser. No. 11/538,084, filed simultaneously, entitled "AUTOMATIC RNC SELECTION FOR IP-CONNECTED RBS";

U.S. patent application Ser. No. 11/538,081, filed simultaneously, entitled FINE-GRAINED ACCESS CONTROL IN A WCDMA SYSTEM USING PICO BASE STATIONS";

U.S. patent application Ser. No. 11/538,080, filed simultaneously, entitled "PAGING FOR A WCDMA SYSTEM USING PICO BASE STATIONS";

U.S. patent application Ser. No. 11/538,077 filed simultaneously, entitled "AUTOMATIC BUILDING OF NEIGHBOR LISTS IN A MOBILE SYSTEM";

U.S. patent application Ser. No. 11/538,078, filed simultaneously, entitled "AUTOMATIC CONFIGURATION OF THE MACRO RADIO IN A PICO BASE STATION"; and, U.S. patent application Ser. No. 11/380,824, filed Apr. 28, 2006, entitled "DYNAMIC BUILDING OF MONITORED SET".

BACKGROUND

I. Technical Field

This invention pertains to wireless telecommunications, and particularly to operation of a femto radio base station in a radio access network (RAN)

II. Related Art and Other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks. The core network has two service domains, with an RNC having an interface to both of these domains.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

As those skilled in the art appreciate, in WCDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handover of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

Other types of telecommunications systems which encompass radio access networks include the following: Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; and the code division multiple access (CDMA) system described in EIA/TIA IS-95.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Source and Serving RNC (SRNC) and a target or drift RNC (DRNC), with the SRNC controlling the connection but with one or more diversity legs of the connection being handled by the DRNC. An Inter-RNC transport link can be utilized for the transport of control and data signals between Source RNC and a Drift or Target RNC, and can be either a direct link or a logical link. An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), it supports the serving RNC (SRNC) by supplying radio resources (within the cells controlled by the drift RNC (DRNC)) needed for a connection with the user equipment unit (UE). A system which includes the drift radio network controller (DRNC) and the base stations controlled over the Iub Interface by the drift radio network controller (DRNC) is herein referenced as a DRNC subsystem or DRNS. An RNC is said to be the Controlling RNC (CRNC) for the base stations connected to it by an Iub interface. This CRNC role is not UE specific. The CRNC is, among other things, responsible for handling radio resource management for the cells in the base stations connected to it by the Iub interface.

Some operators are investigating the possibility of providing home or small area WCDMA coverage for limited number of users using a small radio base station ("RBS"), also called a "Femto RBS" and/or a "Home RBS" and/or "pico RBS" and/or "micro RBS" in some contexts. According to such investigation, the small RBS would provide normal WCDMA coverage for the end users (e.g., to a user equipment unit (UE)), and would be connected to the RNC using some kind of IP based transmission. The coverage area so provided is called a "femto cell" (to indicate that the coverage area is relatively small). Other terminology for a femto cell includes "pico cell" or "micro cell", which is in contrast to a macro cell covered by a macro or standard radio base station (RBS).

One alternative for the IP based transmission is to use Fixed Broadband access (like xDSL, Cable etc.) to connect the home RBS to the RNC. Another alternative would be to use Mobile Broadband access (e.g. HSDPA and Enhanced Uplink). FIG. 12 illustrates the two different backhaul alternatives in more detail. The first alternative is labeled "xDSL Backhaul" and the second alternative is labeled "WiMAX Backhaul".

In general, ordinary WCDMA base stations (macro RBS) are able to connect to an RNC using IP-based transmission.

Operator personnel, e.g., employees of an operator company which owns or maintains the macro RBS nodes and RNC nodes of the radio access network (RAN), typically install the macro RBS nodes. As part of the installation, the macro RBS is manually configured with IP addressing information (DNS name, Fully Qualified Domain Name, FQDN, or IP-address) of the RNC to which the macro RNC is to connect.

By contrast, a femto RBS is typically installed by the end user rather than the network operator. The end users are also able to move the Femto RBS geographically from place to place without the operator being able or willing to control relocation of the femto RBS. Such user-directed relocation requires that, wherever the Femto RBS is installed or located, it should connect to the correct RNC. A "correct RNC" or "preferred RNC" in this sense would be the same RNC that is controlling the overlaying macro cell of the radio access network (RAN), e.g., a "correct macro RNC" or "preferred macro RNC".

Connection to the correct RNC is important since, e.g., it also improves the building of the neighboring cell lists that are needed for roaming and handover between the femto RBS and macro RBS cells. In addition it also minimizes network signaling between control nodes.

Thus, the current technique of manually configuring the RBS with the RNC IP addressing information does not work for the femto RBS scenario, since, e.g., the femto RBS is to be installed by the end users.

What is needed, therefore, and an object herein provided, are method, technique, apparatus, and systems for selecting a correct RNC to serve an femto RBS, for example an IP-connected femto RBS. Such object is particularly valuable when the femto radio base station does not have its own capability to discern the radio access network environment, e.g., when the femto radio base station does not have its own receiver or user equipment unit, for example.

BRIEF SUMMARY

Methods and apparatus enable a femto radio base station, initially connected to a first radio network controller node, to be redirected/reconnected to a second radio network controller node for use as an active radio network controller node for the femto radio base station. The redirection/reconnection is accomplished by using location-indicative information obtained from a user equipment unit which is in radio communication with the femto radio base station. The technique of redirection is particularly valuable when the femto radio base station does not have its own receiver for ascertaining the radio access network (RAN) environment.

In one of its aspects, the technology concerns a method of operating a radio access network. The method includes connecting a femto radio base station to a first radio network controller node of the radio access network. Location-indicative information obtained from a user equipment unit in communication with the femto radio base station is thereafter provided, from the femto radio base station, to the first radio network controller node. The information obtained from the user equipment unit is then used to determine a second radio network controller node to replace the first radio network controller node as an active radio network controller node for the femto radio base station. The femto radio base station can then be instructed to utilize the second radio network controller node rather than the first radio network controller node as the active radio network controller node.

In one example mode, the first radio network controller node is a default radio network controller node, and the femto radio base station is configured initially to connect to the first radio network controller node.

In one example implementation, the location-indicative information obtained from the user equipment unit and provided to the first radio network controller node by the femto radio base station is one of (1) location area identity (LAI) obtained from the user equipment unit when the user equipment unit performs a location area update upon the user equipment unit entering a cell of the femto radio base station; and (2) routing area identity (RAI) obtained from the user equipment unit when the user equipment unit performs a routing area update upon the user equipment unit entering a cell of the femto radio base station.

In one example embodiment and mode, the first radio network controller node configures the user equipment unit to enable the user equipment unit to detect cells on a specified frequency (the specified frequency being used both by the femto radio base station and a macro radio base station). The user equipment unit then detects cells on the specified frequency. Cell identification information (e.g. scrambling code and/or cell identifier) for detected cells is provided as the location-indicative information obtained from the user equipment unit in communication with the femto radio base station to the first radio network controller node.

In another example embodiment and mode, the first radio network controller node configures the user equipment unit to enable the user equipment unit to detect cells, differing ones of the cells operating on corresponding different frequencies. The user equipment unit then detects cells on the corresponding different frequencies. Cell identification information for detected cells is provided as the location-indicative information obtained from the user equipment unit in communication with the femto radio base station to the first radio network controller node. As a variation of this embodiment and mode, configuring the user equipment unit to enable the user equipment unit to operate on different frequencies comprises a trial and error method changing of a monitored set for the user equipment unit.

In another example embodiment and mode, steps of one or more node redirection operations may be utilized either in parallel or in sequence. For example, in this example embodiment and mode, the first radio network controller node can direct the user equipment unit to operate in accordance with a first location strategy and, if the first location strategy supplies insufficient information for locating the femto radio base station, the first radio network controller node can direct the user equipment unit to operate in accordance with a second location strategy.

Another aspect of the technology concerns a femto radio base station configured to connect to a first radio network controller node of the radio access network and thereafter to provide location-indicative information obtained from a user equipment unit in communication with the femto radio base station to the first radio network controller node. The femto radio base station is further configured thereafter upon receiving redirection information based on the location-indicative information to replace the first radio network controller node with a second radio network controller node as an active radio network controller node for the femto radio base station.

Yet another aspect of the technology concerns a radio network controller node of a radio access network. The radio network controller node is configured to use location-indicative information obtained from a user equipment unit in communication with a femto radio base station to determine which other radio network controller node the femto radio base station should use as its active radio network controller node. The radio network controller node can be arranged for operation in accordance with various example modes and embodiments.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1A, FIG. 1B, FIG. 1C, FIG. 1D and FIG. 1E are diagrammatic views of an example embodiment of a telecommunications system including a radio access network and showing different stages of a node redirection operation.

DETAILED DESCRIPTION

Figure 1C:
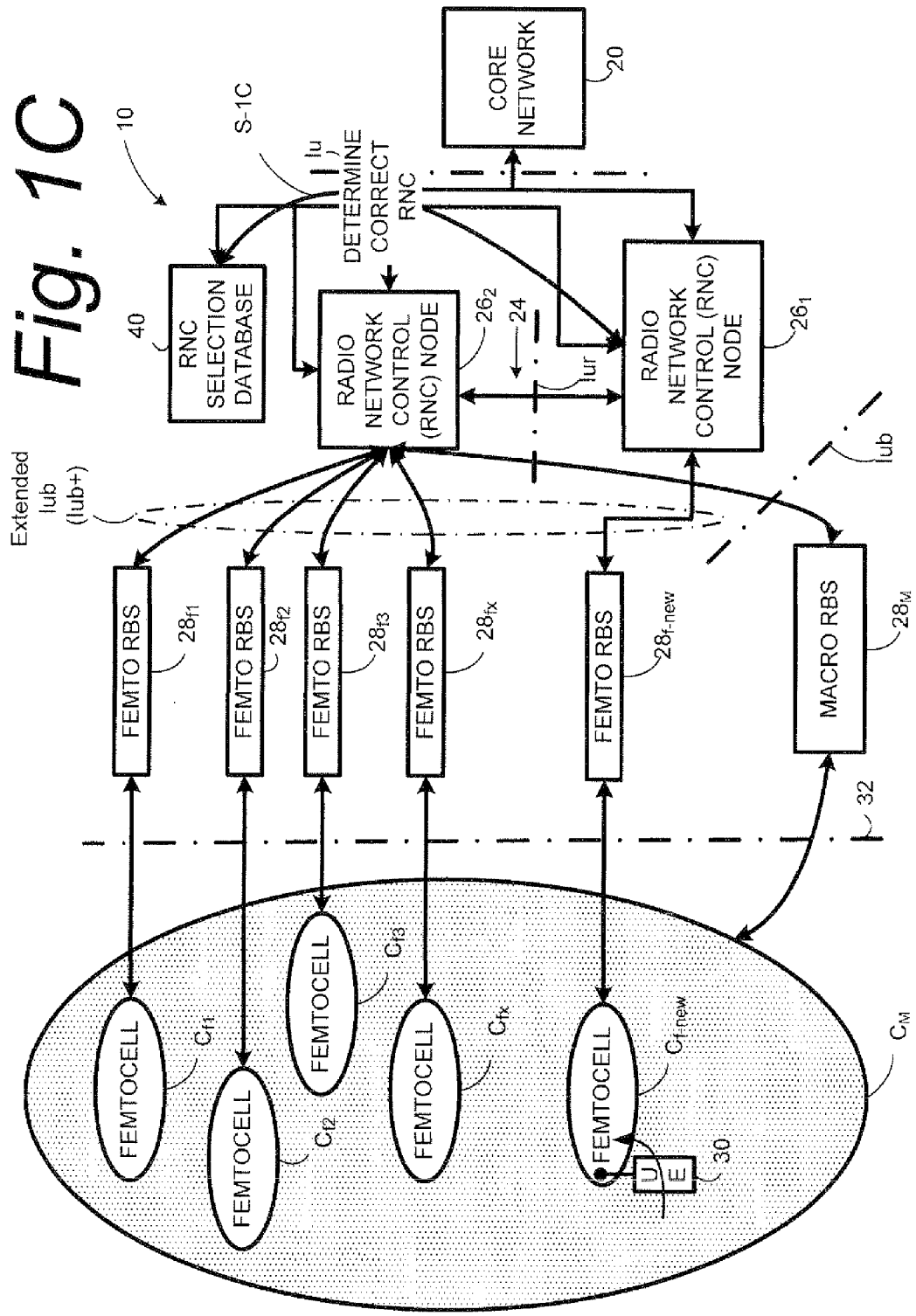

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

The present invention is described in the non-limiting, example context of a telecommunications system 10 shown in FIG. 1A. The telecommunications system 10 connects to a core network 20. The telecommunications system 10 comprises a radio access network 24. The radio access network 24 includes one or more radio network controller nodes (RNCs) 26 and radio base stations (BS) 28. For sake of example FIG. 1A particular shows two radio network control nodes, i.e., a first radio network control $26_1$ and a second radio network control $26_2$ as well as one or more macro radio base stations (only one macro radio base station $28_M$ being shown in FIG. 1A) and plural femto radio base stations $28_{f1}, 28_{f2}, \ldots 28_{fx}$. The macro radio base station $28_M$ serves a macrocell $C_M$. The femto radio base stations $28_{f1}, 28_{f2}, \ldots 28_{fx}$ serve respective femtocells $C_{f1}, C_{f2}, \ldots C_{fx}$. The person skilled in the art understands that a radio base station is typically situated at an interior (e.g., center) of the respective cell which the radio base station serves, but for sake of clarity the macro radio base station and femto radio base stations of FIG. 1A are shown instead as being associated by double headed arrows to their respective cells. At least some of the femtocells $C_{f1}, C_{f2}, \ldots C_{fx}$ are geographically overlayed or overlapped by the macrocell $C_M$.

As used herein, a "femto radio base station" also has the meaning of a pico radio base station or a micro radio base station, which serves a femto cell (or pico cell or micro cell). The femto cell is typically overlaid by one or more macro cells and serves a smaller geographic area or subscriber constituency than a macro cell. The technology described herein has particular benefit for a femto radio base station which can be installed and/or relocated within a radio access network without the installation or relocation being controlled by the owner/operator of the radio access network. In other words, a non-network operator entity (a femto operator or an end user) can acquire the femto radio base station and situate the femto radio base station in accordance with the preferences of the femto operator. In this regard, FIG. 1A happens to show such a femto radio base station $28_{f\text{-}new}$ which has recently been activated by a femto operator. The femto radio base station $28_{f\text{-}new}$ has its femto cel $C_{f\text{-}new}$ situated or located geographically so as to be overlaid by macrocell $C_M$.

A user equipment unit (UE), such as user equipment unit (UE) 30 shown in FIG. 1A, communicates with one or more cells or one or more base stations (BS) 28 over a radio or air interface 32. The user equipment unit can be a mobile station such as a mobile telephone ("cellular" telephone) and laptop with mobile termination, and thus can be, for example, portable, pocket, hand-held, computer-included, or car-mounted mobile device which communicate voice and/or data with radio access network.

The radio access network 24 shown in FIG. 1A can be, by way of non-limiting example, a UMTS Terrestrial Radio Access Network (UTRAN). In the UTRAN, radio access is preferably based upon Wideband Code Division Multiple Access (WCDMA) with individual radio channels allocated using CDMA spreading codes. Of course, other access methods may be employed. The nodes 26 and 28 are respectively termed the radio network control node and the radio base station nodes in view of the UTRAN example. However, it should be understood that the term radio network control and radio base station also encompasses nodes having similar functionality for other types of radio access networks. Other types of telecommunications systems which encompass other types of radio access networks include the following: Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; and the code division multiple access (CDMA) system described in EIA/TIA IS-95.

The radio access network 24 is connected to core network 20 over an interface, such as the Iu interface for UTRAN. The core network 20 of FIG. 1A can comprise, among other things a Mobile Switching Center (MSC) node, a Gateway MSC node (GMSC), a Gateway General Packet Radio Service (GPRS) support node (GGSN), and a Serving GPRS Support node (SGSN). Circuit switched (CS) network or packet switched (PS) network can be connected to core network 20.

For sake of simplicity, the radio access network 24 of FIG. 1A is shown with only two RNC nodes 26. Multiple radio network controller nodes (RNCs) may be provided, with each RNC 26 being connected to one or more base stations (BS) 28. It will be appreciated that a different number of base stations than that shown in FIG. 1A can be served by a radio network controller node 26, and that RNCs need not serve the same number of base stations. Moreover, an RNC can be connected over an Iur interface to one or more other RNCs in radio access network 24, one such instance of an Iur interface being shown in FIG. 1A. The radio network controller node (RNC) 26 communicates over an interface Iub with the macro radio base station $^{28}$M. Further, those skilled in the art will also appreciate that a base station such as the macro radio base station 28 is sometimes also referred to in the art as a radio base station, a node B, or B-node. Each of the radio interface 32, the Iu interface, the Iur interface, and the Iub interface are shown by dash-dotted lines in FIG. 1A.

FIG. 1A also shows by dash-dotted lines an "extended Iub" interface (the "Iub+"interface) which exists between the femto radio base stations $28_f$ and the RNC node 26. The Iub+ interface is, in many respects, a normal Iub interface, but has extensions for redirecting the femto RBS to another RNC. The extended Iub+ interface is preferably formed by an internet protocol (IP) connection.

Figure 4:
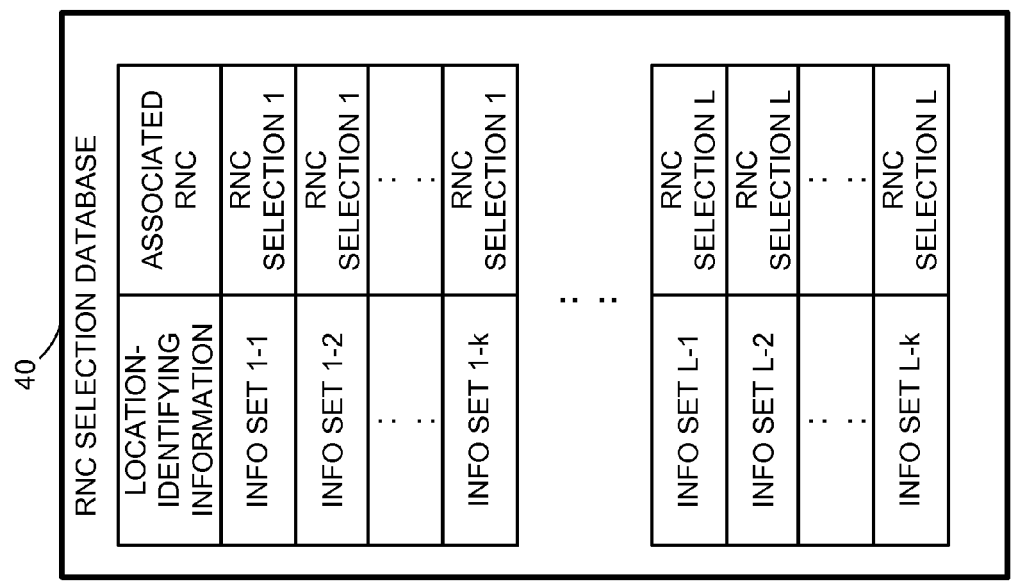
FIG. 4 is a diagrammatic view of an example structure of a RNC selection database.

FIG. 1A also shows that the radio network controller nodes (RNCs) of radio access network 24 have access to RNC selection database 40. The remote unit 40 may be provided as a separate node of RNC selection database 40 as shown, or may be an adjunct of another RAN node (e.g., included in one or more radio network controller nodes (RNCs) 26). Alternatively, in certain cases, access to RNC selection database 40 can even be provided through core network 20. As shown by an example format depicted in FIG. 4, RNC selection database 40 stores information for associating one or more sets of location-indicative information with a particular radio network controller node, so that the particular radio network controller node selected by use of data stored at RNC selection database 40 can be used as an active radio network controller node for a radio base station, and particularly a femto radio base station such as femto radio base station $28_{f\text{-}new}$, which is seeking an optimum or preferred radio network controller node to which to connect or be redirected. In the radio access network 24 shown in FIG. 1A, RNC selection database 40 is shown as being connected to radio network control nodes, and particularly to first radio network controller node RNC $26_1$ and second radio network controller node RNC $26_2$.

FIG. 1A can be viewed as illustrating generic access of femto radio base station $28_{f\text{-}new}$ to the radio access network (RAN), e.g., to its radio network controller node (e.g., radio network controller node $26_1$ in the specifically illustrated scenario). By "generic access" is meant that the access afforded to femto radio base station $28_{f\text{-}new}$ can be either broadband fixed access or broadband wireless (mobile) access (e.g., WiMAX) as described above. In broadband wireless (mobile) access, access for femto radio base station $28_{f\text{-}new}$ to the radio access network 24 is through a macro radio base station, and can occur using, e.g. High Speed Downlink Packet Access (HSDPA) and Enhanced Uplink; or WiMAX. To cater generically to the access types, in FIG. 1A the femto radio base stations $28_f$ including femto radio base stations $28_{f\text{-}new}$ are connected to a communications network 38. An example of such communications network is an IP network 38. Unless otherwise specifically exempted in its context, aspects of the technology described herein are applicable to all types of access, including broadband fixed access and broadband mobile access (e.g., broadband wireless access).

Figure 2:
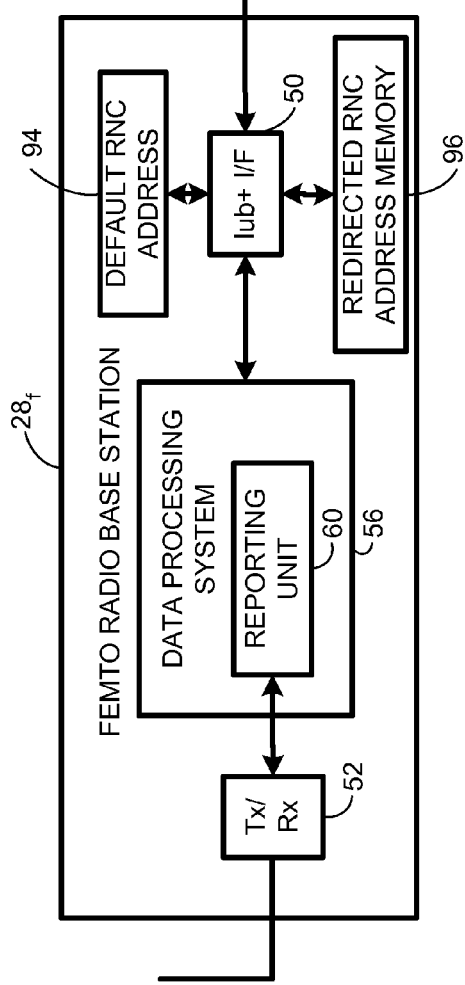
FIG. 2 is a schematic view of an example embodiment of a femto radio base station.

FIG. 2 illustrates basic, selected, representative constituent elements of an example generic femto radio base station $28_f$. One or more of the femto radio base stations $28_{f1}$, $28_{f2}$, ... $28_{fx}$ can take the form of the generic femto radio base station $28_f$ shown of FIG. 2. The femto radio base station $28_f$ of FIG. 2 is shown as including, among its other unillustrated constituent units, an interface unit 50 for connecting with radio network controller node 26 over the Iub+ interface; one or more radio frequency transceivers 52; and, a data processing system, section, or unit 56. The interface unit 50 is, in many respects, a normal Iub interface unit, but has extensions for redirecting the femto RBS to another RNC and to facilitate sending other configuration information from the RNC to the femto RBS. The radio frequency transceivers 52 are for communicating over the radio or air interface with user equipment units (UEs) in the femtocell served by the femto radio base station $28_f$. The connection between RNC 26 and the femto radio base stations $28_f$ utilizes, e.g., Internet Protocol (IP)-based transmission.

Some femto radio base station nodes may further also comprise a receiver for receiving scanned cell information broadcast for one or more receivable cells of the radio access network. However, the femto radio base station $28_{f\text{-}new}$ of FIG. 1A either does not have or does not utilize such receiver. Therefore, standing alone, femto radio base station $28_{f\text{-}new}$ is unable, or otherwise does not, camp on signals from receivable cells (including both WCDMA macrocells and femtocells) for reading the relevant scanned cell information broadcast in those cells. Therefore, when first activated or first moved to a new location (e.g., a new macrocell) an unaided, femto radio base station $28_{f\text{-}new}$ does not know its whereabouts in the radio access network 24 and therefore is unable to determine the optimum macro radio network controller node (RNC) to which it should be connected as its active radio network controller node . However, as described herein, the femto radio base station $28_{f\text{-}new}$ is configured to obtain or ascertain location-indicative information obtained from a user equipment unit which is in radio communication with the femto radio base station, and to report such location-indicative information to the radio access network over interface Iub+. To this end femto radio base station 28 also includes an optional reporting unit 60. In the illustrated implementation of FIG. 2, reporting unit 60 can comprise or be included in data processing system 56, and thereby be part of a controller or processor. The reporting unit 60 performs services such as, for example, providing the location-indicative information obtained from a user equipment unit to the radio access network 24, so that the radio access network 24 can (using, e.g., RNC selection database 40) determine to which macro radio network controller node (RNCs) the femto radio base station $28_{f\text{-}new}$ should be connected. The reporting unit 60 can be optional in the sense, for example, that the location-indicative information can be reported from the user equipment unit to the radio access network 24.

Figure 3:
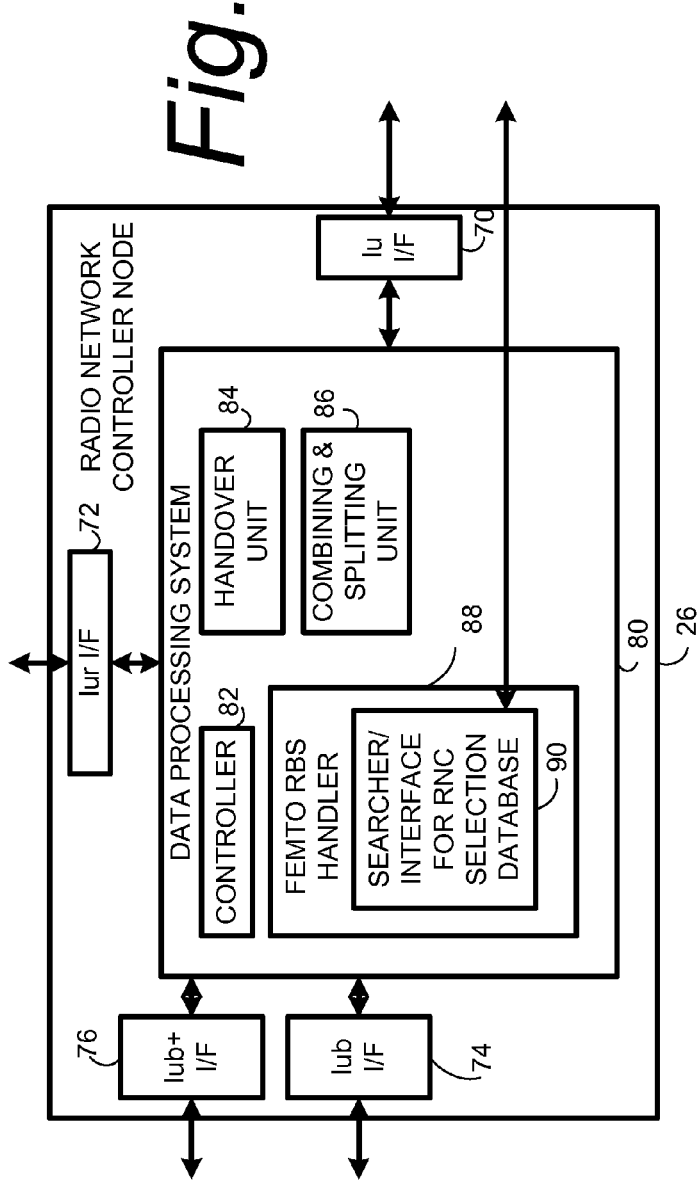
FIG. 3 is a schematic view of a radio network control (RNC) node according to a first example embodiment.

FIG. 3 illustrates basic, selected, representative constituent elements of an example radio network control node 26. The radio network control node 26 can comprise several interface units, such as an interface unit 70 for connecting radio network controller node 26 over the Iu interface to core network 20; an interface unit 72 for connecting radio network controller node 26 over the Iur interface to other (unillustrated) radio network controllers; one or more interface units 74 for connecting radio network control node 26 over the Iub interface to respective one or more macro radio base station $28_M$; and, one or more interface units 76 for connecting radio network control node 26 over the Extended Iub ("Iub+) interface to respective one or more femto radio base stations $28_{f1}$, $28_{f2}$, ... $28_{fx}$. The connection between RNC 26 and the femto radio base stations $28_m$ can utilize, e.g., Internet Protocol (IP)-based transmission. The connection between RNC 26 and the macro radio base station(s) $28_M$ can utilize, e.g., Internet Protocol (IP)-based and/or ATM-based transmission.

In addition to interface units, the radio network control node 26 comprises numerous unillustrated constituent units, as well as a data processing system, section, or unit 80. As shown in FIG. 3, in an example, non-limiting implementation the data processing system 80 of radio network control node 26 comprises a control section (e.g., controller 82); a handover unit 84; a combiner and splitter unit 86 (involved, e.g., in handling diversity legs of a connection); and, a femto radio base station handler 88. The femto radio base station handler 88 includes a searcher interface 90 for RNC selection database 40.

Figure 5:
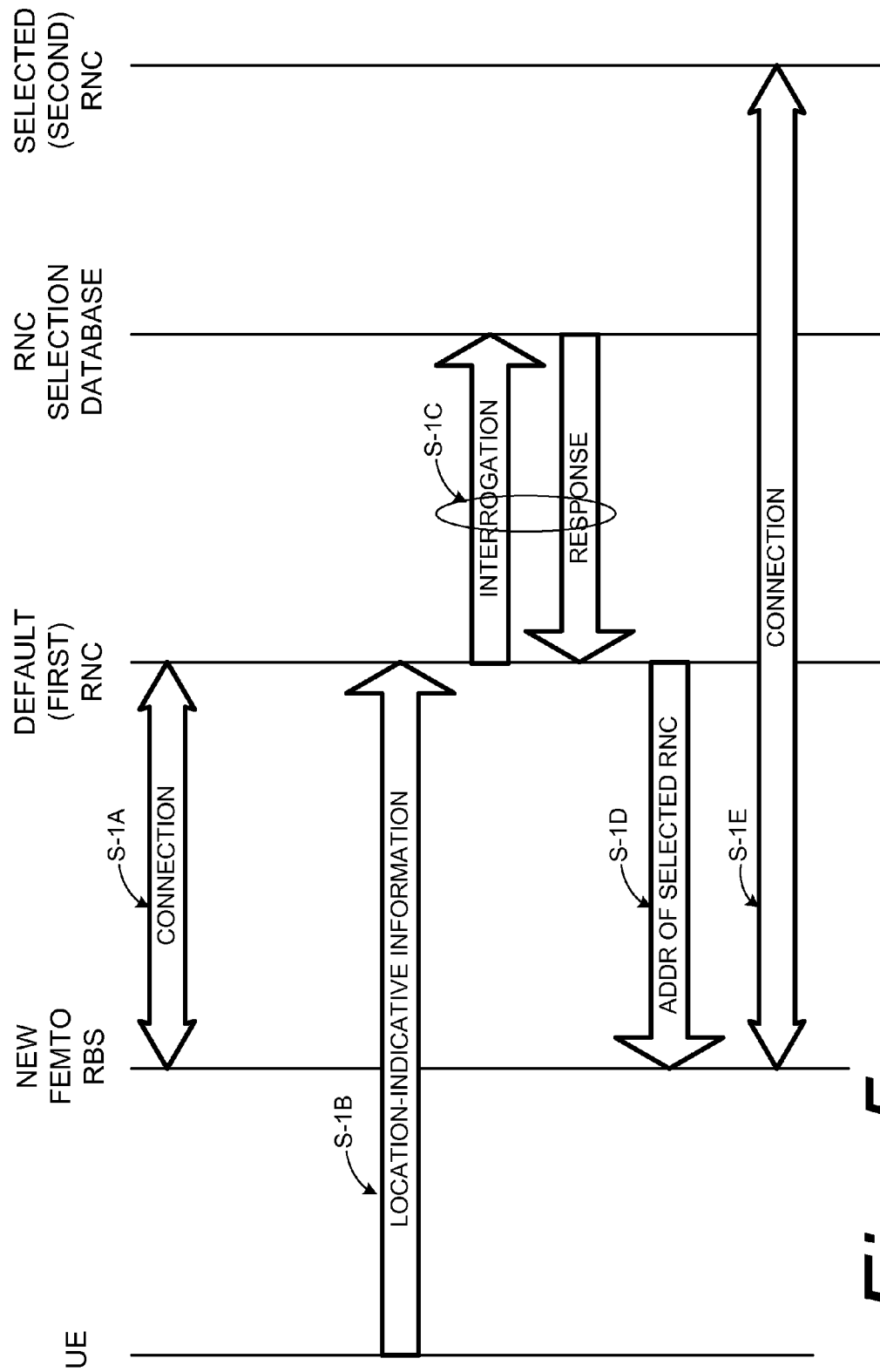
FIG. 5 is a diagrammatic view showing different example stages of a node redirection operation according to a first example mode.

FIG. 1A-FIG. 1E together with FIG. 5 show various example stages of operation for node redirection operation according to a first example mode. At the time shown in FIG. 1A, femto radio base station $28_{f\text{-}new}$ has been activated by a femto operator or an end user but, as explained above, does not yet know its particular whereabouts in the environment of radio access network 24. Not knowing its whereabouts, femto radio base station $28_{f\text{-}new}$ does not know which macro radio network controller node 26 is best situated (geographically or otherwise) to serve as the active macro radio network controller for femto radio base station $28_{f\text{-}new}$. In view of its ignorance with respect to its own situation within radio access network 24, femto radio base station $28_{f\text{-}new}$ is configured, upon activation or start-up, to connect over Iub+ interface to a default macro radio network controller node. In the particular example shown in FIG. 1A, the default macro radio network controller node happens to be first radio network control node $26_1$. Event S-1A in FIG. 1A and in FIG. 5 show femto radio base station $28_{f\text{-}new}$ connecting to its default or first radio network control $26_1$.

A femto radio base station such as femto radio base station $28_{f\text{-}new}$ can be preconfigured (e.g., upon manufacture or release or the like) so that, upon activation, the femto radio base station $28_{f\text{-}new}$ searches for a connection to the Iub+ interface. For example, RBS data processing system 56 of femto radio base station $28_{f\text{-}new}$ can be programmed to locate its interface connection to an internet protocol (IP) network, and to open such connection. Further, as shown in FIG. 2, either RBS data processing system 56 or Iub+interface unit 50 of femto radio base station $28_{f\text{-}new}$ has access to a stored address of the default macro radio network controller node. In this regard, FIG. 2 depicts femto radio base station $28_{f\text{-}new}$ as having a memory or register 94 which stores the IP address information (e.g. DNS name/FQDN or IP address) of the default macro radio network controller node (RNC). In the example of FIG. 1A, default RNC memory 94 stores the IP address information of first macro radio network controller node $26_1$. In one example implementation, the address of the default macro RNC can be pre-stored in default RNC memory 94. The default RNC memory 94 is preferably non-volatile.

In another example implementation, rather than having the address of the default RNC pre-stored in default RNC memory 94, default RNC memory 94 can store IP address information which the RBS data processing system 56 and/or Iub+ interface unit 50 can contact in order to obtain a download of the address of the default RNC. In either implementation or other implementations, the femto radio base station can thus be configured initially to connect to the first radio network controller node, e.g., radio network controller node $26_1$ in the example in FIG. 1A.

As indicated above, upon activation and start-up femto radio base station $28_{f\text{-}new}$ is essentially oblivious as to its location in radio access network. Therefore, the purpose in femto radio base station $28_{f\text{-}new}$ initially connecting via the Iub+ interface to its default macro radio network controller node is so that the femto radio base station $28_{f\text{-}new}$ can be redirected/reconnected to a more preferable macro radio network controller node for use as an active macro radio network controller node. In the situation shown in FIG. 1A, femto radio base station $28_{f\text{-}new}$ is situated in a macrocell $C_M$, which is served by radio base station $26_M$ and second radio network controller node $26_2$. Therefore, judging from the topology of the radio access network 24 (still unknown to femto radio base station $28_{f\text{-}new}$), the preferred radio network control node for femto radio base station $28_{f\text{-}new}$ is second macro radio network controller node $26_2$ rather than the default macro first radio network controller node $26_1$.

Not knowing or being able itself to discern its location in radio access network 24, a user equipment unit 30 served by femto radio base station $28_{f\text{-}new}$ must obtain location-indicative information, and then transmit that location-indicative information to its default radio network control node. Upon receiving the externally-obtained location-indicative information from femto radio base station $28_{f\text{-}new}$, the default radio network controller node (e.g., radio network controller node $26_1$) can consult RNC selection database 40 to learn the preferred radio network control node for use as the active RNC for femto radio base station $28_{f\text{-}new}$, and then relay an identification and address of the preferred radio network controller node to femto radio base station $28_{f\text{-}new}$. Upon receiving an identification and address of its preferred radio network control node, femto radio base station $28_{f\text{-}new}$ can connect to its preferred radio network control node (e.g., radio network controller node $26_2$) over the Iub+ interface.

FIG. 1A depicts a time of activation or start-up of femto radio base station $28_{f\text{-}new}$ (either initial activation/start-up or activation/start-up after relocation of femto radio base station $28_{f\text{-}new}$), and the contacting of its default radio network controller node (e.g., first radio network controller node $26_1$) over Iub+ interface. FIG. 1B-FIG. 1E depict further sequential stages of operation involved in a method of operating radio access network 24 whereby the femto radio base station $28_{f\text{-}new}$ is redirected to a preferred RNC for use as its active radio network control node.

FIG. 1B shows a point in time (after the activate stage of FIG. 1A) in which a user equipment unit (UE) 30 enters into the coverage area of femto radio base station $28_{f\text{-}new}$, e.g., into femtocell $C_{f\text{-}new}$ and establishes radio communication with femto radio base station $28_{f\text{-}new}$. The user equipment unit (UE) 30 has certain location-indicative information by which the location of user equipment unit (UE) 30 can be deduced or otherwise determined. Upon entering into radio communication with user equipment unit (UE) 30, the femto radio base station $28_{f\text{-}new}$ becomes privy to and knows the location-indicative information owned by user equipment unit (UE) 30. FIG. 1B and FIG. 5 depict by event and line S-1B the location-indicative information owned by user equipment unit (UE) 30 both being received by femto radio base station $28_{f\text{-}new}$ over air interface 32 and being transmitted by femto radio base station $28_{f\text{-}new}$ over the Iub+ interface to its default radio network controller node, e.g., to first radio network controller node $26_1$. In some embodiments, a portion of RBS data processing system 56 such as reporting unit 60 can be responsible for examining information received from user equipment unit (UE) 30, filtering or otherwise exacting the location-indicative information, and preparing the location-indicative information for transmission over Iub+ interface to the default radio network control node. Preferably, the location-indicative information is transmitted between the user equipment unit 30 and the first radio network controller node $26_1$.

The location-indicative information owned by user equipment unit (UE) 30 and acquired by femto radio base station $28_{f\text{-}new}$ can be of several types or combinations of types, such as (for example) location area identity (LAI), routing area identity (RAI), cell detection information, and/or measurement reports, as subsequently explained.

FIG. 1C depicts a stage of operation in which the default radio network controller node, e.g., first radio network controller node $26_1$ in the illustrated scenario, contacting RNC selection database 40 in an effort to ascertain the correct RNC node for use by femto radio base station $28_{f\text{-}new}$. Upon having received the location-indicative information from femto radio base station $28_{f\text{-}new}$ over Iub+ interface, the default radio network controller node $26_1$, through its femto radio base station handler 88 (and particularly through its searcher interface 90), communicates with RNC selection database 40, as shown by line and event S-1C in FIG. 1C and FIG. 5. The communication includes both an interrogation message from default radio network controller node $26_1$ to RNC selection database 40, and a response message from RNC selection database 40 to radio network controller node $26_1$. The interrogation message from default radio network controller node $26_1$ includes the location-indicative information, which is utilized by RNC selection database 40 in the manner understood with reference to FIG. 4 to obtain an identification and/or address of the preferred or selected RNC for femto radio base station $28_{f\text{-}new}$. In this regard, RNC selection database 40 considers the location-indicative information as an information set, and matches or maps the location-indicative information set with/to the identity/address of the preferred radio network control node, which becomes the selected radio network controller node for femto radio base station $28_{f\text{-}new}$. The identity and/or address of the radio network control node selected by RNC selection database 40 is thereafter transmitted by RNC selection database 40 to the default radio network controller node, e.g., to first radio network controller node RNC $26_1$ in the response message S-1C of FIG. 1C and FIG. 5.

In the particularly illustrated scenario of FIG. 1A-FIG. 1E, the preferred or selected radio network control node for femto radio base station $28_{f\text{-}new}$ is second radio network controller node $26_2$, as before mentioned.

The response message from RNC selection database 40 as shown in FIG. 1C apprises the default radio network controller node of the identity/address of the preferred radio network controller node for femto radio base station $28_{f\text{-}new}$. For example, a unit such as femto radio base station handler 88 receives the identity/address of the preferred radio network controller node. Thereafter, in the stage of operation shown in FIG. 1D, the identity/address of the preferred radio network controller node for femto radio base station $28_{f\text{-}new}$ is communicated by the default radio network controller node over Iub+ interface to radio base stations (BS) 28 (as depicted by line and step S-1D in FIG. 1D and FIG. 5). The femto radio base station is thus instructed to utilize the second radio network controller node as selected with reference to RNC selection database 40 rather than the default radio network controller node as the active radio network controller node. The identity/address of the preferred radio network controller node for femto radio base station $28_{f\text{-}new}$ is received by Iub+ interface unit 50 and stored in a register or memory 96 as shown in FIG. 2. The register or memory 96 thus is also known as redirected RNC address memory 96, and is preferably accessible by Iub+ interface unit 50 and RBS data processing system 56.

FIG. 1E shows a further stage of operation in which femto radio base station $28_{f\text{-}new}$, now knowing the identity or address of its preferred radio network controller node, makes effort to reconnect to its preferred radio network controller node. In other words, in the scenario of FIG. 1A-FIG. 1E, femto radio base station $28_{f\text{-}new}$ attempts to reconnect to second radio network controller node $26_2$. Contact with its preferred radio network control node is accomplished by using identification/address information now stored in redirected RNC address memory 96. Contact with the preferred radio network control node, e.g., with second radio network controller node $26_2$, is depicted by line and step S-1E in FIG. 1E and FIG. 5.

In the case that femto radio base station $28_{f\text{-}new}$ receives from its default radio network controller the address of the selected radio network controller to which it is to be redirected, such address (stored in redirected RNC address memory 96) can be utilized in conjunction with an internet protocol connection to the new radio network control which is to be used as the active radio network controller for femto radio base station $28_{f\text{-}new}$. In another case in which identifying information other than the address of the selected radio network control for femto radio base station $28_{f\text{-}new}$ is obtained, the femto radio base station $28_{f\text{-}new}$ may contact another IP address with the selected node identifying information, and obtain from a server or the like at the other IP address the address to use for contacting the radio network control to which femto radio base station $28_{f\text{-}new}$ is to be directed.

Upon making connection with its preferred or selected radio network control node, femto radio base station $28_{f\text{-}new}$ is able to communicate through its currently preferred radio network control node in the performance of its connection handling of the mobile stations (e.g., user equipment units) served thereby.

Should the femto radio base station $28_{f\text{-}new}$ thereafter be relocated to another position in the radio access network 24, steps and stages such as illustrated by FIG. 1A-FIG. 1E would again be performed. In such case the femto radio base station $28_{f\text{-}new}$ would again connect (upon activation after relocation) either to its default radio network control node (e.g., first radio network controller node $26_1$). Alternatively, the moved or moving femto radio base station $28_{f\text{-}new}$ may be able to remain in contact with its previous RNC which can serve in similar manner as the default RNC (and which senses that the femto radio base station $28_{f\text{-}new}$ has moved upon acquiring new location-indicative information which reflects the movement of the femto radio base station $28_{f\text{-}new}$). Thereafter (e.g., upon acquiring location-indicative information from a user equipment unit (UE)), the femto radio base station $28_{f\text{-}new}$ can be redirected to a preferred or "correct" radio network control node as selected by RNC selection database 40, for example.

In one example implementation, the location-indicative information obtained from the user equipment unit and provided to the first radio network controller node by the femto radio base station is area identity information obtained by user equipment unit (UE) 30. For example, the area identity information can be one of (1) location area identity (LAI) obtained from the user equipment unit when the user equipment unit performs a location area update upon the user equipment unit entering a cell of the femto radio base station; and (2) routing area identity (RAI) obtained from the user equipment unit when the user equipment unit performs a routing area update upon the user equipment unit entering a cell of the femto radio base station.

Figure 6:
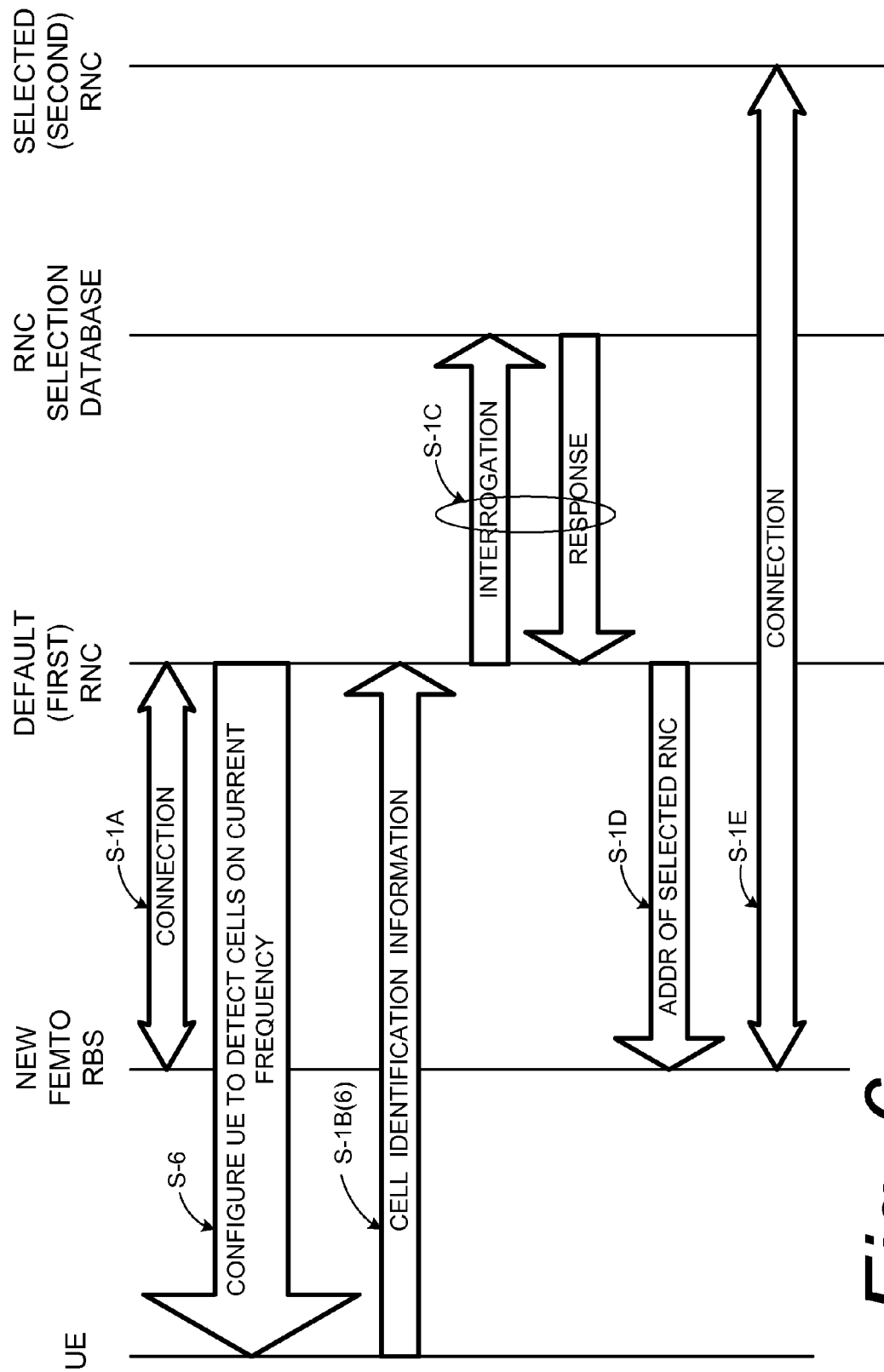
FIG. 6 is a diagrammatic view showing different example stages of a node redirection operation according to a second example embodiment and mode.

FIG. 6 shows a node redirection operation according to another example mode. The example events or steps of FIG. 6 include similarly numbered ones of the example events or steps of FIG. 5, but additionally shows event or step S-6. In the mode of FIG. 6, after femto radio base station $28_{f\text{-}new}$ is connected to the default radio network control node, as event or step S-6. The first (default) radio network controller node configures the user equipment unit 30 to enable the user equipment unit 30 to detect cells on the current frequency (the current frequency being used both by the femto radio base station and a macro radio base station). The default radio network controller (RNC) (i.e., radio network controller node $26_1$) knows which frequency is used by the femto radio base station since the radio network controller (RNC) $26_1$ has automatically configured the radio part of the femto RBS $28_{f\text{-}new}$ in the step S-6. The default radio network controller (RNC) $26_1$ cannot really be certain that there are also macro cells in the location of a specific radio base station, but the intention is to let the user equipment unit report the detected macro and femto cells on the same frequency, if any, to the current radio network controller (RNC) $26_1$. The user equipment unit 30 then detects cells on the frequency the femto radio base station $28_{f\text{-}new}$ is also operating on. Then, as step S-1B(6), cell identification information for detected cells is provided as the location-indicative information obtained from the user equipment unit 30 in communication with the femto radio base station $28_f$ to the default radio network controller node. The remaining steps of events of the FIG. 6 mode are essentially similar to correspondingly numbered steps of the previously-discussed FIG. 5 mode.

Current specifications (3GPP TS 25.331 V6.10.0, incorporated herein by reference) define that cell identification information consists only of the scrambling code and Ec/No (the ratio of desired receive power per chip to receive power density in the band) and/or Received Signal Code Power (RSCP) measurement values for the detected unknown cells (i.e. cells in the detected set). Scrambling codes are normally also reused in UTRAN networks, so it is probably not possible to find out the location based on detection of one cell with a specific scrambling code (as this code can be also reused in another parts of the network). However, depending on the reuse factor, the detected cells can be used in combination with other methods/modes (such as the mode of FIG. 8 described below). In addition, a cell planning database or tool can provide a possible list of other neighboring cells that would then need to be checked with the other mechanisms (e.g. check the existence of an Inter-frequency cell).

Figure 7:
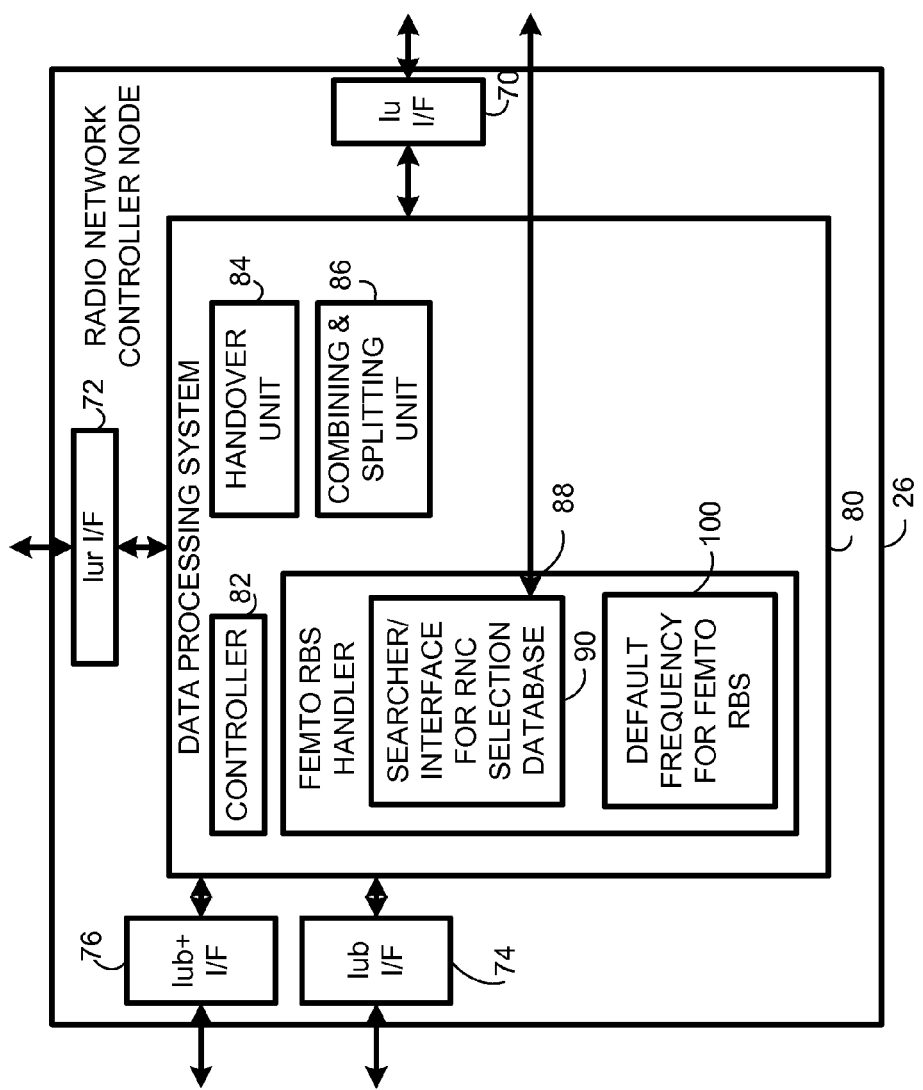
FIG. 7 is a schematic view of a radio network control (RNC) node according to the second example embodiment.

In view of the fact that the default radio network control of the FIG. 6 mode downloads a default or specified frequency to the user equipment unit(s) connected through femto radio base station $28_{f\text{-}new}$, FIG. 7 shows that the default radio network controller node (for example, the femto radio base station handler 88 of the default radio network controller) can be provided with a memory or register 100 or the like (preferably non-volatile) in which is stored a default frequency for download to femto radio base station. In other respects, the default radio network control of the example embodiment and mode of FIG. 6 is similar to that previously described.

Figure 8:
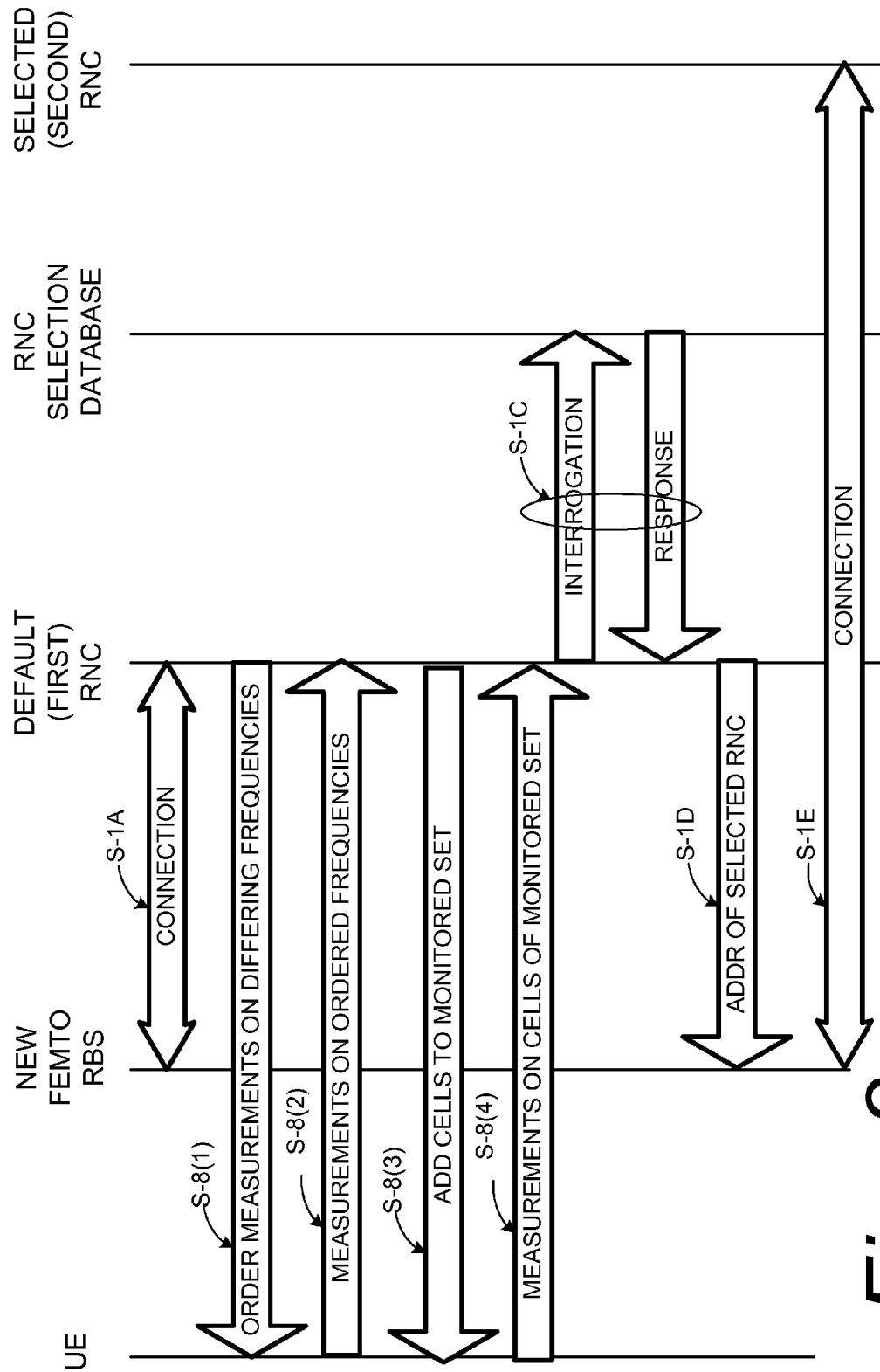
FIG. 8 is a diagrammatic view showing different example stages of a node redirection operation according to a third example embodiment and mode.

FIG. 8 shows yet another embodiment and example mode of a node redirection operation. Various example steps of FIG. 8 are understood with respect to corresponding numbered, previously-discussed steps of FIG. 6 and FIG. 5. In the example embodiment and mode of FIG. 8, the default radio network controller node configures the user equipment unit 30 to enable the user equipment unit 30 to detect cells, differing ones of the cells operating on corresponding different frequencies. In this regard, as reflected by step or event S-8(1) in FIG. 8 a user equipment unit (UE) in connected mode can be ordered to measure on other Inter-frequency cells or other Inter-RAT (i.e. GSM) cells, with the prospect of adding these cells in the Monitored Set. FIG. 8 shows (as step S-8(2)) the user equipment unit (UE) reporting measurements for the frequencies ordered in step S-8(1). FIG. 8 further shows, as step S-8(3), the default radio network controller 26$_1$ adding the cells of one or more of the measured frequency(ies) to the monitored set and, as step S-8(4), the user equipment unit (UE) returning measurements of the cells of the monitored set.

Figure 9:
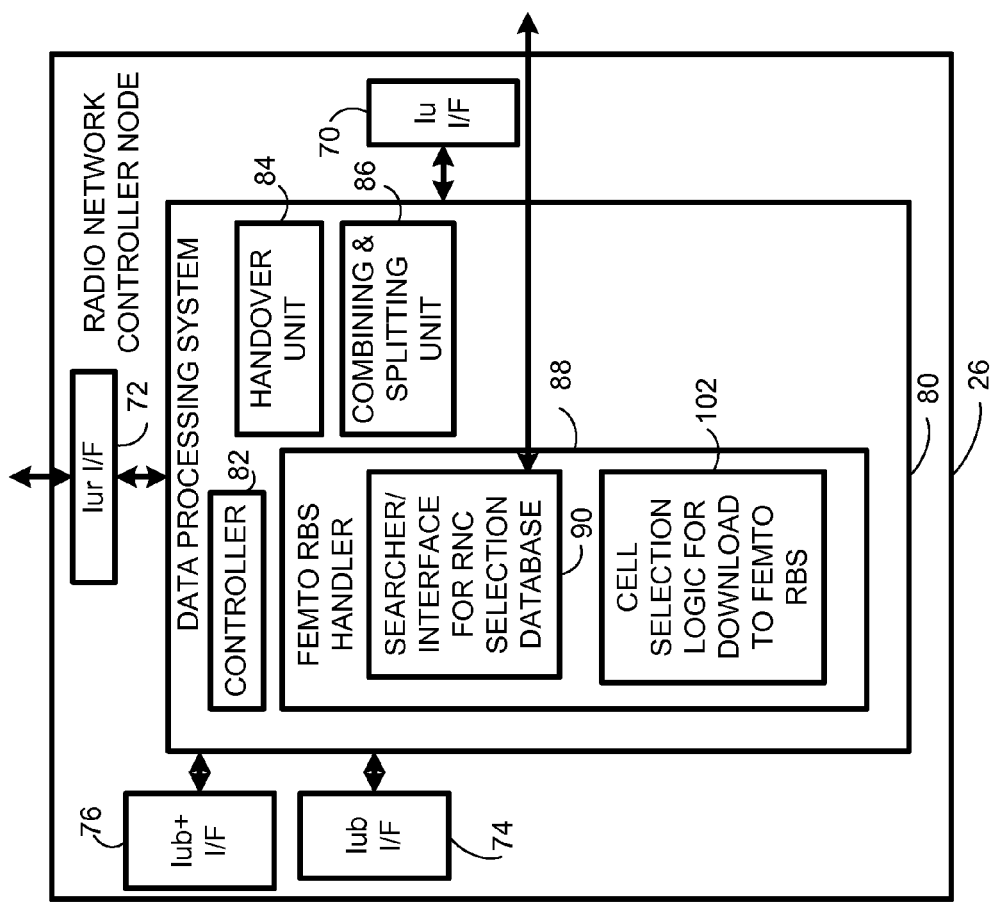
FIG. 9 is a schematic view of a radio network control (RNC) node according to the third example embodiment.

The ordering of such measurements (as reflected by steps S-8(1)-S-8(4) of FIG. 8) may be on a trial-and-error approach or logic. In other words, one or more of steps S-8(1)-S-8(4) may be repeated in an iterative basis according to cell selection logic of the default radio network controller. In this regard, for the example mode and embodiment of FIG. 8, FIG. 9 shows an example default radio network controller node having (for example in its femto radio base station handler 88) cell selection logic functionality 102 which selects or determines the cell(s)/frequency(ies) to be downloaded in conjunction with steps S-8(1)-S-8(4). In other respects, the default radio network control of the example embodiment and mode of FIG. 6 is similar to that previously described.

As an example of the trial and error method approach/logic mentioned above for a variation of the FIG. 8 mode, based on, e.g. the LAI/RAI and/or the detected set reported on the same frequency, the default radio network controller can add some macro cells to verify if the user equipment unit can hear these cells. The measurement report should be configured so that the user equipment unit will report the cell at once, if detected. If the user equipment unit (UE) does not report anything, then the default radio network controller can change the Monitored Set and add another cell, and so on until there is enough information about the location of the femto RBS. The user equipment unit 30 can then detect cells on the corresponding different frequencies. Cell identification information for detected cells is provided as the location-indicative information obtained from the user equipment unit 30 in communication with the femto radio base station 28$_f$ to the default radio network controller node.

In the FIG. 6 mode/embodiment described above, the LAI/RAI information together with the detected unknown cells in the same frequency could be enough to identify the macro cells. This would be based on that the scrambling codes are not reused inside one LAI/RAI. However, if it turns out that the scrambling codes are reused in one LA/RA, then additional information would be needed for best locating the femto radio base station $28_{f\text{-}new}$. In such case in which additional information is needed, the mode of FIG. 6 could be followed by or at least steps thereof used in conjunction with another mode, such as the mode of FIG. 8. For example, the mode of FIG. 8 employs, e.g., the inter-frequency cell measurements as described above and the cells of those frequencies are added to the Monitored Set based on information retrieved in the previous steps.

Thus, steps of one or more node redirection operations may be utilized either in parallel or in sequence. In other words, the default or first radio network controller node can direct the user equipment unit to operate in accordance with a first location strategy and, if the first location strategy supplies insufficient information for locating the femto radio base station, the first radio network controller node can direct the user equipment unit to operate in accordance with a second location strategy.

Figure 10:
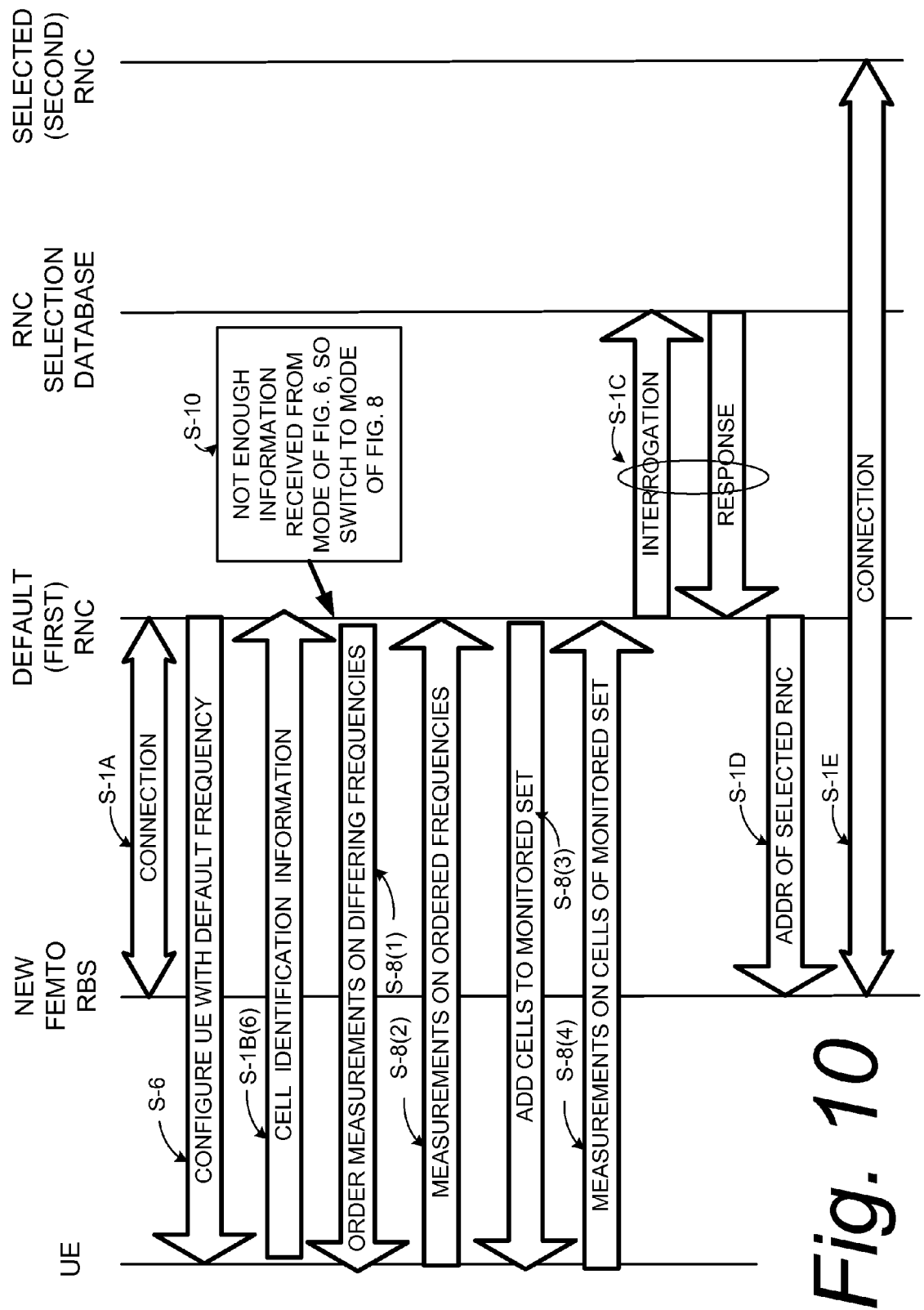
FIG. 10 is a diagrammatic view showing different example stages of a node redirection operation according to a fourth example embodiment and mode.
Figure 11:
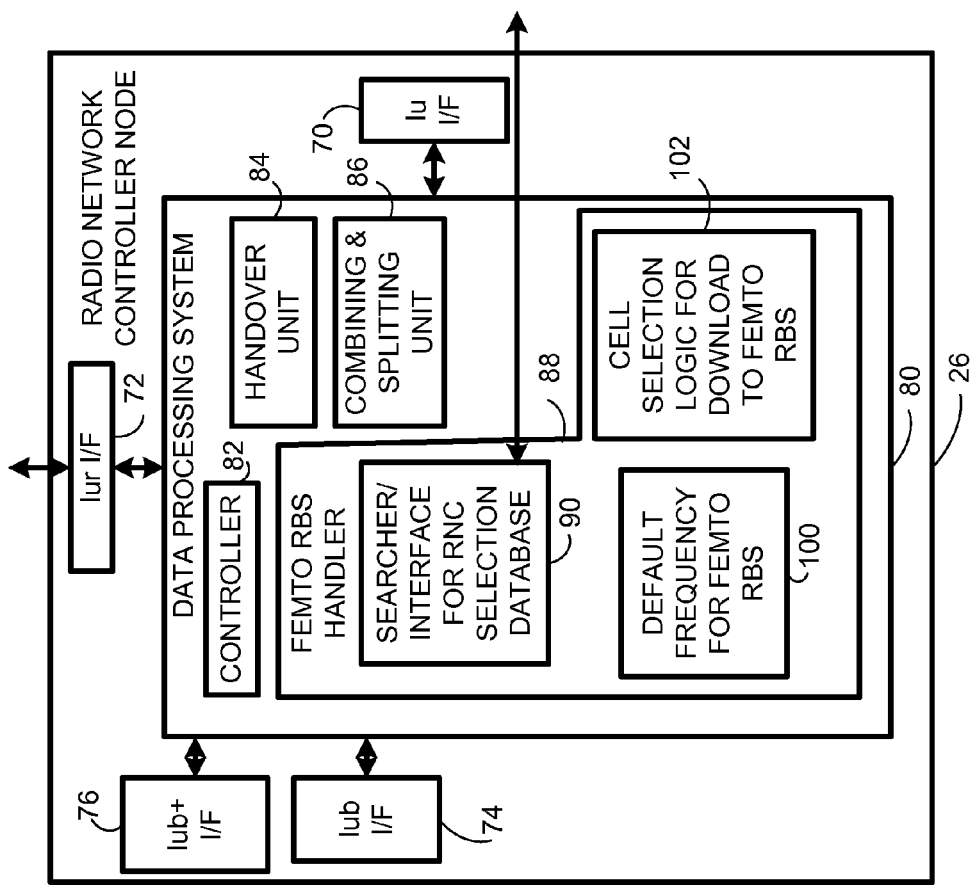
FIG. 11 is a schematic view of a radio network control (RNC) node according to the fourth example embodiment.
Figure 12:
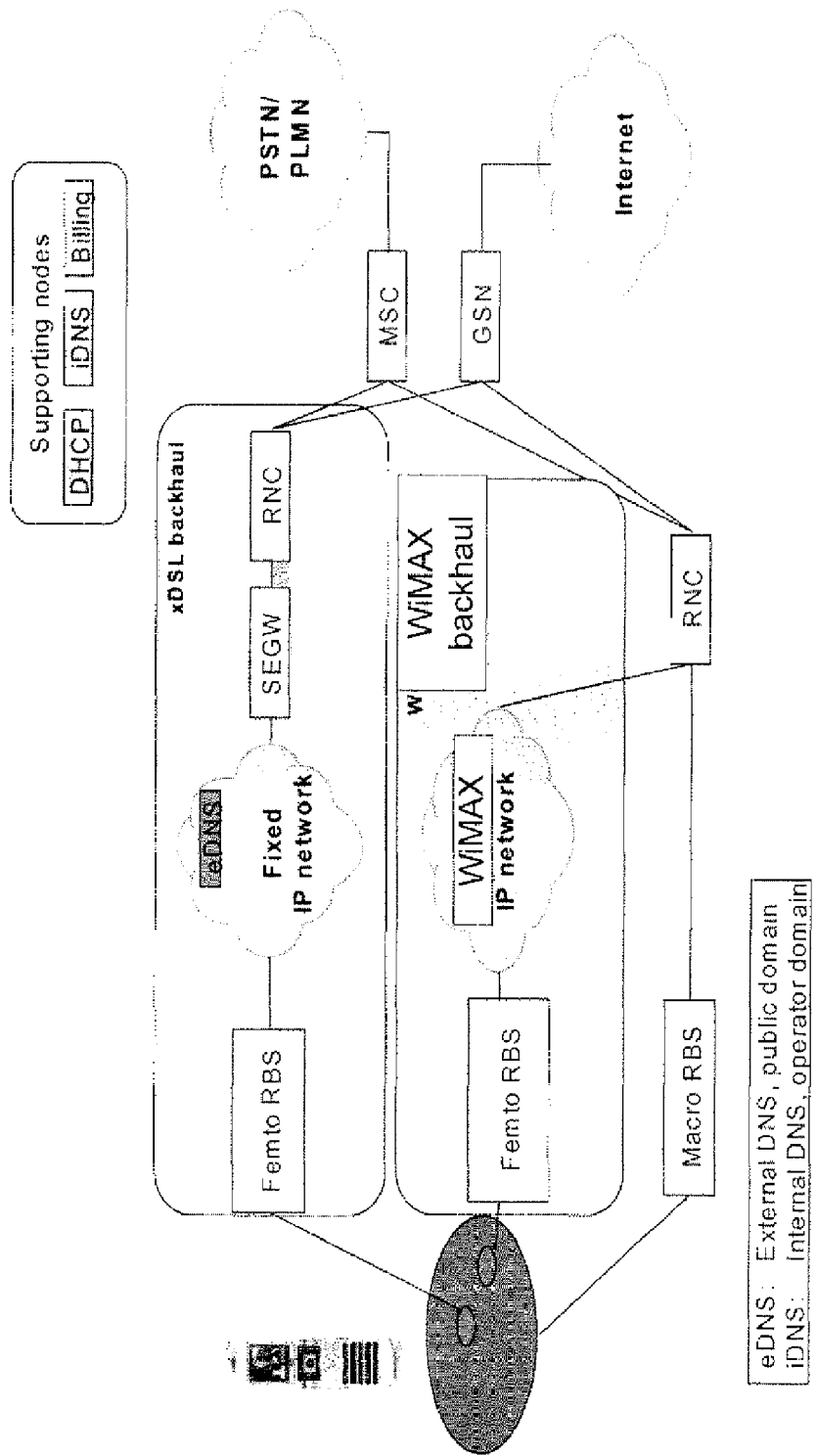
FIG. 12 is a diagrammatic view showing two different backhaul alternatives.

Combining modes can result in a new mode, such as the example embodiment and mode illustrated in FIG. 10. The mode of FIG. 10 combines some steps from the mode of FIG. 6 and some steps from the mode of FIG. 8. In this regard, the mode of FIG. 10 begins by implementing steps of the mode of FIG. 6, e.g., step S-6 wherein the first (default) radio network controller node configures the user equipment unit 30 in accordance with a first location strategy, e.g., to enable the user equipment unit 30 to detect cells on a default or specified frequency and step S-1B(6) wherein cell identification information for detected cells is provided as the location-indicative information obtained from the user equipment unit 30 in communication with the femto radio base station 28$_f$ to the default radio network controller node. In the FIG. 10 mode, the cell identification information provided by step S-1B(6) may be insufficient (as reflected by step S-10) due to any number of reasons, such as (for example) scrambling codes being reused in one LA/RA. As such, and as further reflected by step S-10, the default radio network controller node switches modes, e.g., switches from the mode of FIG. 6 to the mode of FIG. 8, which becomes the second location strategy. Accordingly, step of the mode of FIG. 8 are shown subsequent to the determination and switch of step S-10. To cater for the determination and switch, FIG. 11 shows an example configuration of a default radio network control for the embodiment and mode of FIG. 10 having both a memory or register 100 or the like (in which is stored a default frequency for download to femto radio base station) and cell selection logic functionality 102 which selects or determines the cell(s)/frequency(ies) to be downloaded in conjunction with steps S-8(1)-S-8(4). The femto radio base station handler 88 of the FIG. 10 embodiment has logic for determining when the information gleaned from a user equipment unit (UE) in accordance with a first attempted mode (e.g., the mode of FIG. 6) is insufficient, and for switching to a second mode (e.g., the mode of FIG. 8).

Thus, as one aspect of the technology, femto radio base station $28_{f\text{-}new}$ is configured to connect to a default radio network controller node of the radio access network and thereafter to provide location-indicative information obtained from the user equipment unit 30 (in communication with femto radio base station $28_{f\text{-}new}$) to the default radio network controller node. The femto radio base station $28_{f\text{-}new}$ is further configured thereafter upon receiving redirection information based on the location-indicative information to replace the default radio network controller node with a second radio network controller node as an active radio network controller node for femto radio base station $28_{f\text{-}new}$.

As another aspect of the technology, the default network controller node is configured to use location-indicative information obtained from a user equipment unit in communication with a femto radio base station to determine which other radio network controller node the femto radio base station should use as its active radio network controller node.

Thus, femto radio base station $28_{f\text{-}new}$ initially connects to a default RNC in the network. The address or identity of this default RNC is configured in femto radio base station $28_{f\text{-}new}$. When an user equipment unit (UE) contacts the femto radio base station $28_{f\text{-}new}$, the user equipment unit (UE) provides some information (e.g., location-indicative information) about the surrounding WCDMA coverage to the default RNC. The default RNC uses the received information and redirects the femto radio base station $28_{f\text{-}new}$ to another RNC, the "correct" or "selected" or "preferred" RNC.

The correct RNC can also later check if the Femto RBS has been moved to another location by looking at further information received from the UE.

Examples of the type of information and procedures could be used by an RNC to find out the correct RNC to which the femto radio base station $28_{f\text{-}new}$ should be connected are provided below.

The default RNC can be configured with a unique Location Area Identity (LAI). This means that when UEs enter the Femto Cell of femto radio base station $28_{f\text{-}new}$, the user equipment unit (UE) will trigger a Location Area Update. The default RNC can then perform 'layer violation' and check the Mobility Management message Location Area Update to find the last LAI that the user equipment unit (UE) has successfully registered to. In some scenarios, this can give quite good estimate of the location of the femto radio base station $28_{f\text{-}new}$. However, this LAI method does not work well in the case the user equipment unit (UE) is switched off in a location far away from the femto radio base station $28_{f\text{-}new}$, and is then turned on in the femto cell of femto radio base station $28_{f\text{-}new}$. This method could be improved by checking that the same LAI is reported more than once by the user equipment unit (UE). Another improvement would be to also check the type of the Location Update. If it indicates "IMSI attach", then the user equipment unit (UE) is being switched on and the LAI is nothing to count on. If the type indicates "normal Location updating", then the LAI is more trust-worthy.

If the same frequency is used for both macro and femto cells, then the RNC can configure the user equipment unit (UE) for measurements to detect unknown cells in the same frequency (using the measurement event 1*d*). In this way the UE can indicate what are the surrounding UTRAN cells and the RNC would be able to redirect the UE to the correct RNC.

If same frequency is not used for macro and femto cells, then the RNC can configure the user equipment unit (UE) for inter-frequency measurements to detect cells in other frequencies. This can be based on a trial and error mechanism so that the RNC checks if the user equipment unit (UE) can hear different cells. If one set of cells does not provide any measurement results from the user equipment unit (UE), the RNC would need to change the cell set and try again. In this way the UE can indicate what are the surrounding UTRAN cells and the (default) RNC would be able to redirect the UE to the correct RNC.

Thus, as an advantage of the technology, a femto RBS such as femto radio base station $28_{f\text{-}new}$ can be moved by the end users (e.g., femto operators) and it will still connect to the correct RNC.

As mentioned previously, the foregoing principle/method can also be applied for other radio technologies. The technology has particular relevance of the aforementioned and conveniently described system and scenarios, but could also be applied in other cases and for other networks.

Although various embodiments have been shown and described in detail, the claims are not limited to any particular embodiment or example. None of the above description should be read as implying that any particular element, step, range, or function is essential. The invention is not to be limited to the disclosed embodiment, but on the contrary, is intended to cover various modifications and equivalent arrangements.

What is claimed is:

1. A method of operating a femto radio base station, the method comprising:

moving the femto radio base station to a new location or activating the femto radio base station in the new location, at the new location the femto radio base station unaided not knowing its whereabouts in a radio access network;

connecting the femto radio base station to a first macro radio network controller node of the radio access network for use as a default macro radio network controller node;

obtaining information from a user equipment unit in communication with the femto radio base station to the first macro radio network controller node;

sending the information obtained from the user equipment unit through the first macro radio network controller node of the radio access network and receiving, in response thereto, an identification of a second macro radio network controller node to replace the first macro radio network controller node as an active macro radio network controller node for the femto radio base station; and utilizing the second macro radio network controller node rather than the first macro radio network controller node as the active macro radio network controller node for the femto radio base station.

2. The method of claim 1, further comprising instructing the femto radio base station to utilize the second radio network controller node rather than the first radio network controller node as the active radio network controller node.

3. The method of claim 1, wherein the first radio network controller node is a default radio network controller node, and further comprising preconfiguring the femto radio base station to connect to the first radio network controller node.

4. The method of claim 1, wherein the information obtained from the user equipment unit and provided to the first radio network controller node by the femto radio base station is one of (1) location area identity (LAI) obtained from the user equipment unit when the user equipment unit performs a location area update upon the user equipment unit entering a cell of the femto radio base station; and (2) routing area identity (RAI) obtained from the user equipment unit when the user equipment unit performs a routing area update upon the user equipment unit entering a cell of the femto radio base station.

5. The method of claim 1, further comprising:
the first radio network controller node configuring the user equipment unit to enable the user equipment unit to detect at least one cell on a specified frequency, the specified frequency being used both by the femto radio base station and a macro radio base station;
using the user equipment unit for detecting at least one cell on the specified frequency;
providing cell identification information for the at least one detected cell as the information obtained from the user equipment unit in communication with the femto radio base station to the first radio network controller node.

6. The method of claim 1, further comprising:
the first radio network controller node configuring the user equipment unit to enable the user equipment unit to operate on different frequencies for detecting at least one cell;
using the user equipment unit for detecting at least one cell;
providing cell identification information for the at least one detected cell as the information obtained from the user equipment unit in communication with the femto radio base station to the first radio network controller node.

7. The method of claim 6, wherein the step of configuring the user equipment unit to enable the user equipment unit to operate on different frequencies comprises a trial and error changing of a monitored set for the user equipment unit.

8. The method of claim 1, further comprising:
the first radio network controller node directing the user equipment unit to operate in accordance with a first location strategy;
if the first location strategy supplies insufficient information for locating the femto radio base station, the first radio network controller node directing the user equipment unit to operate in accordance with a second location strategy.

9. The method of claim 8, wherein the first strategy comprises the first radio network controller node configuring the user equipment unit to enable the user equipment unit to detect at least one cell on a specified frequency, and wherein the second strategy comprises the first radio network controller node configuring the user equipment unit to enable the user equipment unit to operate on different frequencies for detecting at least one cell.

10. The method of claim 9, wherein the different frequencies comprise one or both of frequencies for inter-frequency cells and frequencies for inter-radio access technology (RAT) cells.

11. A femto radio base station comprising:
a data processing system configured to connect the femto radio base station to a first macro radio network controller node of the radio access network upon the femto radio base station moving to a new location or being activated in the new location whereat the femto radio base station does not know its whereabouts in a radio access network, the first radio network controller node being a default macro radio network controller node to which the data processing system is configured to send information obtained from a user equipment unit in communication with the femto radio base station;
a memory configured to store an identity or address of a second macro radio network controller node received by the femto radio base station in response to the femto radio base station sending the information obtained from a user equipment unit to the first macro radio network controller node;
wherein the data processing system is further configured to connect the femto radio base station to the second macro radio network controller node whereby the second macro radio network controller node replaces the first macro radio network controller node as an active radio network controller node for the femto radio base station.

12. The apparatus of claim 11, wherein the location-indicative information obtained from the user equipment unit and provided to the first radio network controller node via the femto radio base station is one of (1) location area identity (LAI) obtained from the user equipment unit when the user equipment unit performs a location area update upon the user equipment unit entering a cell of the femto radio base station; and (2) routing area identity (RAI) obtained from the user equipment unit when the user equipment unit performs a routing area update upon the user equipment unit entering a cell of the femto radio base station.

13. The apparatus of claim 11, wherein the location-indicative information obtained from the user equipment unit is cell identification information detected by the user equipment unit.

14. A radio access network comprising:
a femto radio base station;
a first macro radio network controller node;
a second macro radio network controller node;
wherein the femto radio base station comprises a data processing system configured to connect the femto radio base station to a first macro radio network controller node of the radio access network upon the femto radio base station moving to a new location or being activated in the new location whereat the femto radio base station does not know its whereabouts in a radio access network, the first radio network controller node being a default macro radio network controller node to which the data processing system is configured to send location-indicative information obtained from a user equipment unit in communication with the femto radio base station;
wherein the radio network controller node is configured to use the location-indicative information obtained from the user equipment unit to determine that the femto radio base station should use the second radio network controller node as its active radio network controller node;
wherein the femto radio base station further comprises:
a memory configured to store an identity or address of the second macro radio network controller node received by the femto radio base station in response to the femto radio base station sending the information obtained from a user equipment unit to the first macro radio network controller node;
wherein the data processing system is further configured to connect the femto radio base station to the second macro radio network controller node whereby the second macro radio network controller node replaces the first macro radio network controller node as an active radio network controller node for the femto radio base station.

15. The apparatus of claim 14, wherein the radio network controller node is configured for instructing the femto radio base station to utilize the second radio network controller node as the active radio network controller node.

16. The apparatus of claim 14, wherein the information obtained from the user equipment unit and provided to the radio network controller node by the femto radio base station is one of (1) location area identity (LAI) obtained from the user equipment unit when the user equipment unit performs a location area update upon the user equipment unit entering a cell of the femto radio base station; and (2) routing area identity (RAI) obtained from the user equipment unit when the user equipment unit performs a routing area update upon the user equipment unit entering a cell of the femto radio base station.

17. The apparatus of claim 14, wherein the first radio network controller node is further configured to instruct the user equipment unit to detect at least one cell, and wherein the location-indicative information obtained from the user equipment unit in communication with the femto radio base station comprises cell identification information for the at least one detected cell.

18. The apparatus of claim 14, wherein the first radio network controller node is further configured to instruct the user equipment unit to detect at least one cell on a specified frequency, the specified frequency being used both by the femto radio base station and a macro radio base station, and wherein the location-indicative information obtained from the user equipment unit in communication with the femto radio base station comprises cell identification information for the at least one detected cell.

19. The apparatus of claim 14, wherein the first radio network controller node is further configured to instruct the user equipment unit to detect at least one cell by operating on different frequencies; and wherein the location-indicative information obtained from the user equipment unit in communication with the femto radio base station comprises cell identification information for the at least one detected cell.

20. The apparatus of claim 19, wherein the first radio network controller node is configured to enable the user equipment unit to operate on a trial and error approach for changing of a monitored set for the user equipment unit.

21. The apparatus of claim 14, wherein the first radio network controller node is arranged for directing the user equipment unit to operate in accordance with a first location strategy and is further arranged, if the first location strategy supplies insufficient information for locating the femto radio base station, for directing the user equipment unit to operate in accordance with a second location strategy.

22. The apparatus of claim 21, wherein the first strategy comprises the first radio network controller node configuring the user equipment unit to enable the user equipment unit to detect at least one cell on a specified frequency, and wherein the second strategy comprises the first radio network controller node configuring the user equipment unit to enable the user equipment unit to operate on different frequencies for detecting at least one cell.

23. The apparatus of claim 22, wherein the different frequencies comprise one or both of frequencies for inter-frequency cells and frequencies for inter-radio access technology (RAT) cells.

* * * * *

UNITED STATES PATENT AND TRADEMARK OFFICE
CERTIFICATE OF CORRECTION

PATENT NO. : 7,817,997 B2
APPLICATION NO. : 11/538088
DATED : October 19, 2010
INVENTOR(S) : Nylander et al.

It is certified that error appears in the above-identified patent and that said Letters Patent is hereby corrected as shown below:

On the Title Page
On Page 2, in item (56), under "OTHER PUBLICATIONS", in Column 2, Line 6, delete "v U.S." and insert -- U.S. --, therefor.

In Column 7, Line 63, delete "cel" and insert -- cell --, therefor.

In Column 8, Line 48, delete "$^{28}$M." and insert -- $28_M$. --, therefor.

In Column 10, Line 38, delete "$28_m$" and insert -- $28_M$ --, therefor.

In Column 11, Line 46, delete "$26_M$" and insert -- $28_M$ --, therefor.

Signed and Sealed this
Twenty-second Day of March, 2011

David J. Kappos
*Director of the United States Patent and Trademark Office*